US012626662B2

(12) United States Patent
Ha

(10) Patent No.: US 12,626,662 B2
(45) Date of Patent: May 12, 2026

(54) DISPLAY DEVICE AND METHOD FOR DRIVING THE SAME

(71) Applicant: LG Display Co., Ltd., Seoul (KR)

(72) Inventor: Jihoon Ha, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/974,464

(22) Filed: Dec. 9, 2024

(65) Prior Publication Data

US 2025/0104636 A1 Mar. 27, 2025

Related U.S. Application Data

(63) Continuation of application No. 18/238,812, filed on Aug. 28, 2023, now Pat. No. 12,190,809.

(30) Foreign Application Priority Data

Dec. 26, 2022 (KR) ........................ 10-2022-0184188

(51) Int. Cl.
*G09G 3/3233* (2016.01)
*G09G 3/20* (2006.01)

(52) U.S. Cl.
CPC ......... *G09G 3/3233* (2013.01); *G09G 3/2096* (2013.01); *G09G 2300/0426* (2013.01); *G09G 2300/0452* (2013.01); *G09G 2300/0842* (2013.01); *G09G 2320/0626* (2013.01)

(58) Field of Classification Search
CPC ....................................................... G06F 3/011
See application file for complete search history.

(56) References Cited

U.S. PATENT DOCUMENTS

2002/0070846 A1* 6/2002 Bastian, II ........... G06Q 10/087 340/5.92
2008/0055196 A1 3/2008 Izumida
2009/0315921 A1* 12/2009 Sakaigawa ........... G09G 3/3413 345/694
2011/0069096 A1 3/2011 Li et al.
2012/0105515 A1 5/2012 Iwasaki et al.
2015/0109286 A1* 4/2015 Verbeure .............. G09G 3/3406 345/545
2016/0012774 A1* 1/2016 Ohara .................. G09G 3/3225 345/694
2016/0064612 A1* 3/2016 Ren .................. G02F 1/133524 349/62

(Continued)

FOREIGN PATENT DOCUMENTS

KR 10-2020-0144039 A 12/2020

*Primary Examiner* — Nan-Ying Yang
(74) *Attorney, Agent, or Firm* — Birch, Stewart, Kolasch & Birch, LLP

(57) ABSTRACT

A display device may include a display panel including at least one of a first sub-pixel, a second sub-pixel and a third sub-pixel, and a driver configured to control a light-emission operation of the at least one of the first to third sub-pixels. In addition, the driver may be configured to control the light-emission operation of the at least one of the first to third sub-pixels so that, in a first control mode, a pulse width is fixed and a data voltage value is varied such that the at least one sub-pixel emits light at a first luminance, and, in a second control mode, the data voltage value is fixed, and the pulse width is varied such that the at least one sub-pixel emits light at a second luminance.

16 Claims, 12 Drawing Sheets

(56) References Cited

U.S. PATENT DOCUMENTS

| | | | | |
|---|---|---|---|---|
| 2016/0275845 | A1* | 9/2016 | Tsai | G09G 3/2003 |
| 2019/0258346 | A1* | 8/2019 | Cheng | H10D 86/40 |
| 2020/0365078 | A1* | 11/2020 | Zhai | G09G 3/3233 |
| 2021/0059027 | A1 | 2/2021 | Lopez et al. | |
| 2021/0248953 | A1* | 8/2021 | Kwon | G09G 3/32 |
| 2022/0367839 | A1* | 11/2022 | Huang | G02B 5/22 |

* cited by examiner

DISPLAY DEVICE AND METHOD FOR DRIVING THE SAME

CROSS-REFERENCE TO RELATED APPLICATION

This application is a Continuation of U.S. application Ser. No. 18/238,812, filed on Aug. 28, 2023, which claims priority to Korean Patent Application No. 10-2022-0184188 filed on Dec. 26, 2022 in the Republic of Korea, the entire contents of all these applications being hereby expressly incorporated by reference into the present application.

BACKGROUND

Field

The present disclosure relates to a display device using a light-emitting element and a method for driving the same.

Discussion of Related Art

A display device with a self-light-emitting element can be implemented to be thinner than a display device with a built-in light source, and has the advantage of being able to implement a flexible and foldable display device.

Such a display device having the self-light-emitting element can include an organic light-emitting display device using a light-emissive layer made of an organic material, and a micro-LED display device using a micro light-emitting diode (LED).

However, while the organic light-emitting display device does not require a separate light source, a defective pixel can easily occur due to moisture and oxygen. Thus, various technical ideas are additionally used to minimize penetration of oxygen and moisture. In response to this demand, research and development on a display device using a micro light-emitting diode as a light-emitting element has been conducted. Such a light-emitting display device has high image quality and high reliability and thus is in the limelight as the next-generation display device.

The micro light-emitting element is a semiconductor light-emitting element that uses property of emitting light when current flows through a semiconductor, and is widely used in a lighting apparatus, TV, and various display devices.

Further, as a current level of the micro light-emitting element is higher, the external quantum efficiency (EQE) has a normal value, and light-emitting efficiency is improved.

However, when a micro light-emitting element is used in a small display device using a relatively low current, the micro light-emitting element can have a lowered EQE.

SUMMARY OF THE DISCLOSURE

Accordingly, in order to solve or address the above-mentioned and other disadvantages and limitations associated with the related art, the inventor of the present disclosure has invented an improved display device capable of driving a micro-LED element such that the external quantum efficiency (EQE) is not lowered even when the micro light-emitting element is used in a small display device.

Therefore, a technical purpose to be achieved by the present disclosure is to provide a display device and a method for driving the same in which when a micro-LED element is used in a small display device, the micro-LED element operates in a low luminance operation mode and a high luminance operation mode, and in the low luminance operation mode, a data voltage is fixed and a pulse width is varied to set the luminance, and in the high luminance operation mode, the pulse width is fixed and the data voltage is varied to set the luminance.

Purposes according to the present disclosure are not limited to the above-mentioned purpose. Other purposes and advantages according to the present disclosure that are not mentioned can be understood based on following descriptions, and can be more clearly understood based on embodiments according to the present disclosure. Further, it will be easily understood that the purposes and advantages according to the present disclosure can be realized using means shown in the claims or combinations thereof.

A display device according to one embodiment of the present disclosure can include a display panel including at least one of a first sub-pixel, a second sub-pixel and a third sub-pixel; and a driver configured to control light-emission operation of the at least one of the first to third sub-pixels, wherein the driver is configured to control the light-emission operation of the at least one of the first to third sub-pixels such that a data voltage value set in a first control mode is applied to the at least one sub-pixel for a pulse width set in a second control mode.

A method for driving a display device according one embodiment of the present disclosure is provided, wherein the display device can include a display panel including at least one of a first sub-pixel, a second sub-pixel, a third sub-pixel and a fourth sub-pixel; a light-emission transistor connected to each of the first to fourth sub-pixels; a driving transistor connected to the light-emission transistor; and a driver configured to control light-emission operation of the at least one sub-pixel, wherein the method can include receiving a light-emitting control signal in response to application of an image signal from a timing controller; turning on the driving transistor; switching the driving transistor so that a data voltage set in a first control mode is applied to the at least one sub-pixel; turning on the light-emission transistor; switching the light-emission transistor for a set pulse width in a second control mode; and emitting a light of the at least one sub-pixel in the pulse width set in the second control mode by the data voltage set in the first control mode.

A display device according to one embodiment of the present disclosure can include a display panel including at least one of a first sub-pixel, a second sub-pixel and a third sub-pixel; and a driver configured to control a light-emission operation of the at least one of the first to third sub-pixels, wherein the driver is configured to control the light-emission operation of the at least one of the first to third sub-pixels so that a data voltage value set in a first control mode is applied, in a fixed manner, to the at least one of the first to third sub-pixels in a second control mode.

A method for driving a display device according one embodiment of the present disclosure is provided, wherein the display device includes: a display panel including at least one of a first sub-pixel, a second sub-pixel, and a third sub-pixel; a driver configured to control a light-emission operation of the at least one of the first to third sub-pixels, wherein the driver is configured to control the light-emission operation of the at least one of the first to third sub-pixels so that: in a first control mode, a pulse width is fixed, and a data voltage value is varied such that the at least one sub-pixel emits light at first luminance; in a second control mode, the data voltage value is fixed, and the pulse width is varied such that the at least one sub-pixel emits light at second luminance; and in a third control mode, the pulse width is fixed, and the data voltage value is varied such that the at least one sub-pixel emits light at third luminance.

According to the embodiment of the present disclosure, even when the micro-LED element is used in a small display device, a decrease in external quantum efficiency (EQE) can be suppressed or minimized.

Further, according to the embodiment of the present disclosure, the current value of the micro-LED element is fixed rather than variable, such that color coordinates may not be distorted when the LED element displays an image.

Further, according to an embodiment of the present disclosure, the micro-LED element can be used for a small display device. Therefore, the micro-LED element according to an embodiment of the present disclosure can avoid the low EQE efficiency period and thus be designed to be suitable for a small or large display device.

Further, according to an embodiment of the present disclosure, the micro-LED element is applied to a small display device, such that high image quality and high reliability of the small display device can be achieved.

Moreover, according to an embodiment of the present disclosure, a display device with high resolution, a narrow bezel, and low power consumption and a method for driving the same can be realized using the micro-LED element.

Effects of the present disclosure are not limited to the effects as mentioned above, and other effects not mentioned will be clearly understood by those skilled in the art from the descriptions below.

In addition to the effects as described above, specific effects of the present disclosure will be described together while describing specific details for carrying out the present disclosure.

BRIEF DESCRIPTION OF DRAWINGS

The present disclosure will become more fully understood from the detailed description given hereinbelow and the accompanying drawings which are given by way of illustration only, and thus are not limitative of the present disclosure.

DETAILED DESCRIPTION OF THE EMBODIMENTS

Figure 1:
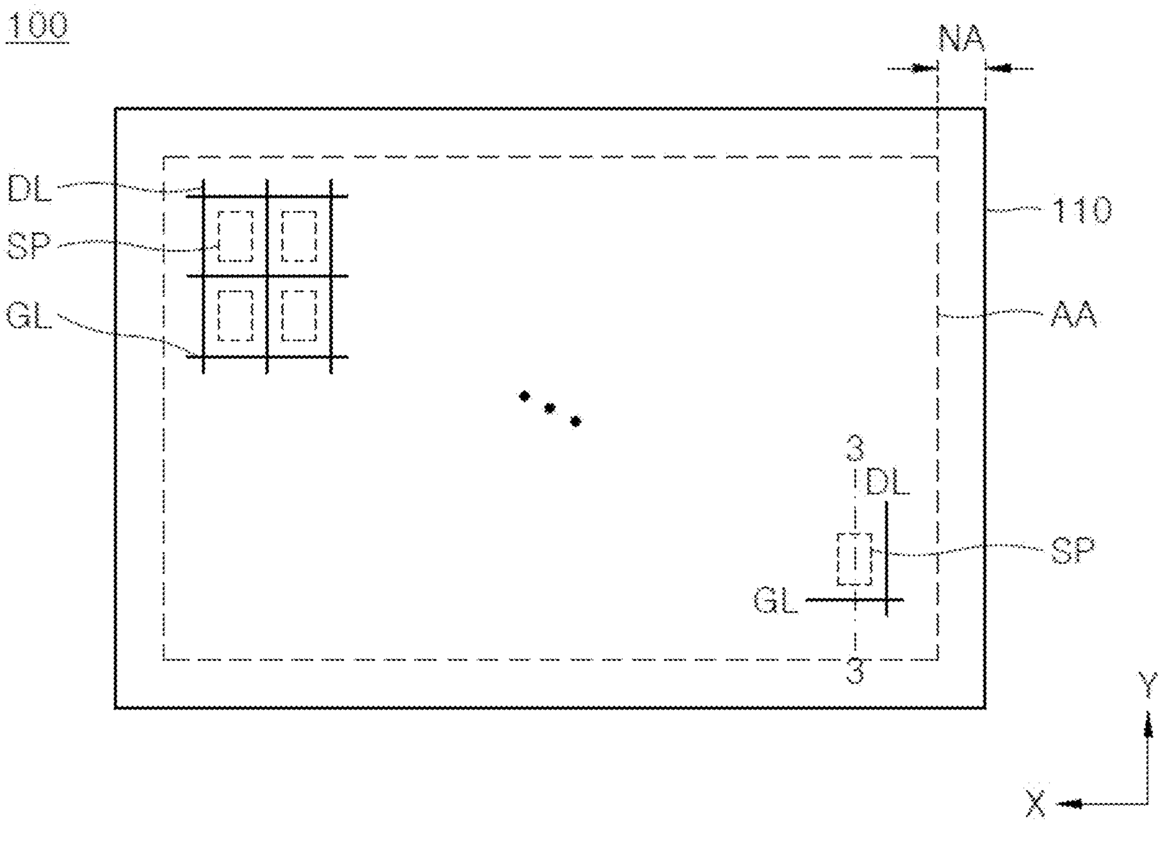
FIG. 1 is a schematic plan view for illustrating a display device having a plurality of sub-pixels according to an embodiment of the present disclosure.

Advantages and features of the present disclosure, and a method of achieving the advantages and features will become apparent with reference to embodiments described later in detail together with the accompanying drawings. However, the present disclosure is not limited to the embodiments as disclosed under, but can be implemented in various different forms. Thus, these embodiments are set forth only to make the present disclosure complete, and to completely inform the scope of the present disclosure to those of ordinary skill in the technical field to which the present disclosure belongs.

For simplicity and clarity of illustration, elements in the drawings are not necessarily drawn to scale. The same reference numbers in different drawings represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure can be practiced without these specific details. In other instances, well-known methods, procedures, components, and circuits have not been described in detail so as not to unnecessarily obscure aspects of the present disclosure. Examples of various embodiments are illustrated and described further below. It will be understood that the description herein is not intended to limit the claims to the specific embodiments described. On the contrary, it is intended to cover alternatives, modifications, and equivalents as can be included within the spirit and scope of the present disclosure as defined by the appended claims.

A shape, a size, a ratio, an angle, a number, etc. disclosed in the drawings for describing embodiments of the present disclosure are illustrative, and the present disclosure is not limited thereto. The same reference numerals refer to the same elements herein. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure can be practiced without these specific details. In other instances, well-known methods, procedures, components, and circuits have not been described in detail so as not to unnecessarily obscure aspects of the present disclosure.

The terminology used herein is directed to the purpose of describing particular embodiments only and is not intended to be limiting of the present disclosure. As used herein, the singular constitutes "a" and "an" are intended to include the plural constitutes as well, unless the context clearly indicates otherwise. It will be further understood that the terms "comprise", "including", "include", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of associated listed items. Expression such as "at least one of" when preceding a list of elements can modify the entire list of elements and may not modify the individual elements of the list. In interpretation of numerical values, an error or tolerance therein can occur even when there is no explicit description thereof.

In addition, it will also be understood that when a first element or layer is referred to as being present "on" a second element or layer, the first element can be disposed directly on the second element or can be disposed indirectly on the second element with a third element or layer being disposed between the first and second elements or layers. It will be understood that when an element or layer is referred to as being "connected to", or "coupled to" another element or layer, it can be directly on, connected to, or coupled to the other element or layer, or one or more intervening elements or layers can be present. In addition, it will also be understood that when an element or layer is referred to as being "between" two elements or layers, it can be the only element or layer between the two elements or layers, or one or more intervening elements or layers can also be present.

Further, as used herein, when a layer, film, region, plate, or the like is disposed "on" or "on a top" of another layer, film, region, plate, or the like, the former can directly contact the latter or still another layer, film, region, plate, or the like can be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like is disposed "below" or "under" another layer, film, region, plate, or the like, the former can directly contact the latter or still another layer, film, region, plate, or the like can be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

In descriptions of temporal relationships, for example, temporal precedent relationships between two events such as "after", "subsequent to", "before", etc., another event can occur therebetween unless "directly after", "directly subsequent" or "directly before" is indicated.

When a certain embodiment can be implemented differently, a function or an operation specified in a specific block can occur in a different order from an order specified in a flowchart. For example, two blocks in succession can be actually performed substantially concurrently, or the two blocks can be performed in a reverse order depending on a function or operation involved.

It will be understood that, although the terms "first", "second", "third", and so on can be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described under could be termed a second element, component, region, layer or section, without departing from the spirit and scope of the present disclosure.

The features of the various embodiments of the present disclosure can be partially or entirely combined with each other, and can be technically associated with each other or operate with each other. The embodiments can be implemented independently of each other and can be implemented together in an association relationship.

In interpreting a numerical value, the value is interpreted as including an error range unless there is no separate explicit description thereof.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a display device and a method for driving the same according to one or more embodiments of the present disclosure will be described. All the components of each display device according to all embodiments of the present disclosure are operatively coupled and configured.

Figure 2:
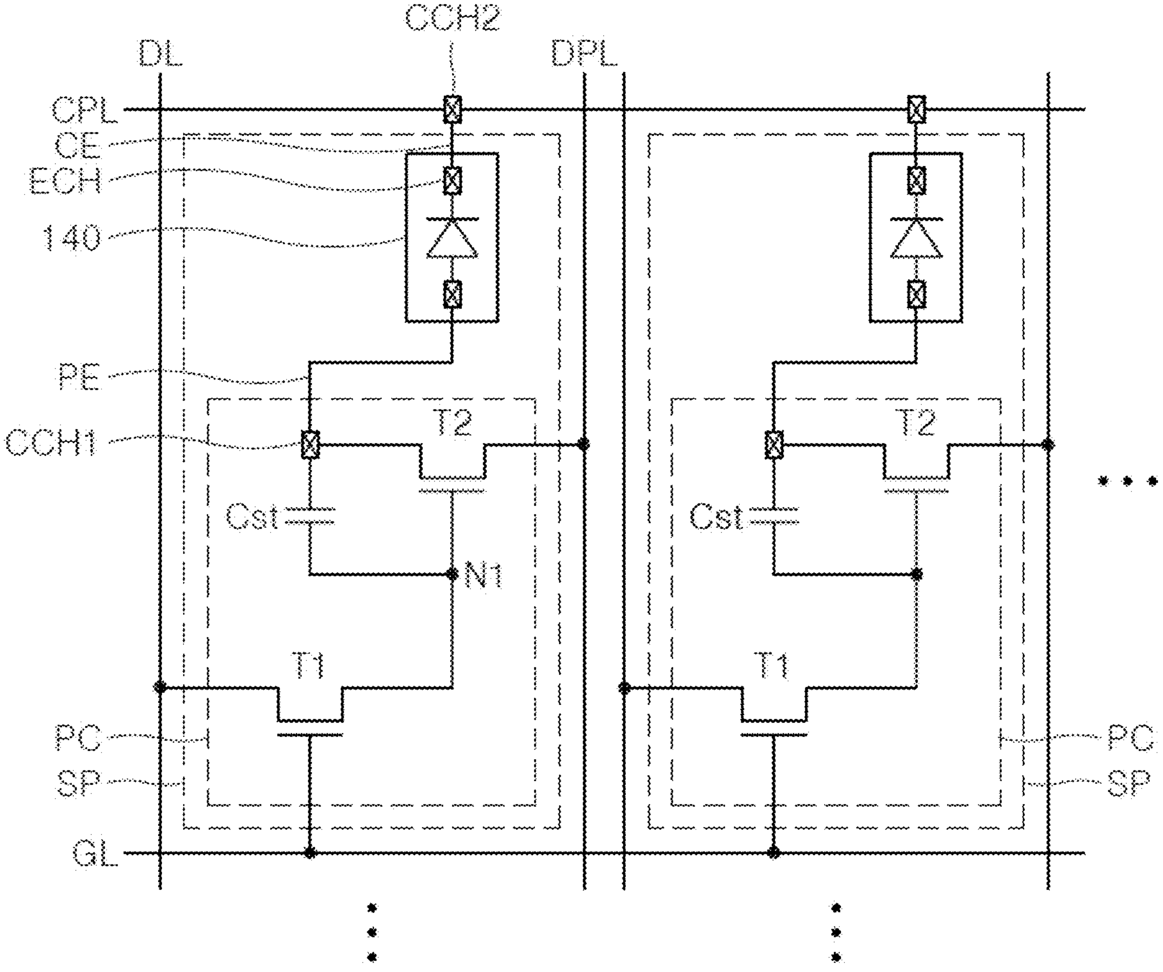
FIG. 2 is a schematic circuit diagram for illustrating a driver circuit for driving a sub-pixel according to an embodiment of the present disclosure.

FIG. 1 is a schematic plan view for illustrating a display device having a plurality of sub-pixels according to an embodiment of the present disclosure. FIG. 2 is a schematic circuit diagram for illustrating a driver circuit for driving a sub-pixel according to an embodiment of the present disclosure.

Referring to FIG. 1 and FIG. 2, a display device 100 according to an embodiment of the present disclosure includes a substrate 110 in which a display area (active area) AA having a plurality of unit pixels, and a non-display area (non-active area) NA are defined.

A unit pixel can be composed of a plurality of sub-pixels SP on a front surface of the substrate 110, and can include, but is not limited to, sub-pixels SP that emit red, blue, and green light. Further, the unit pixel can include a sub-pixel that emits white light. In this regard, a sub-pixel can be referred to as a 'light-emitting element'. The light-emitting element can be embodied as, for example, a micro-LED element (140, see FIG. 4A) or a micro-LED chip 140.

The substrate 110 can be a thin-film transistor array substrate, and can be made of glass or plastic material. The substrate 110 can be divided into two or more layers, or can be a laminate of two or more substrates. The non-display area NA can be defined as an area on the substrate 110 excluding the display area AA, can have a relatively narrow width, and can be defined as a bezel area.

In this regard, the substrate 110 can have a plurality of sub-pixels as the light-emitting elements 140 arranged on the display area AA thereto to constitute a display panel. Thus, hereinafter, the substrate 110 can be referred to as "a display panel 110".

Further, the display device 100 includes the substrate 110 on which the plurality of light-emitting elements 140 are disposed. Thus, hereinafter, the display device 100 can be referred to as, for example, "a light-emitting element display device 100".

Each of the plurality of pixels is disposed in the display area AA. In this regard, the plurality of pixels can be arranged in the display area AA at a first reference pixel pitch preset along an X-axis direction and a second reference pixel pitch preset along a Y-axis direction intersecting the X-axis direction. The first reference pixel pitch can be defined as a distance between centers of adjacent pixels in the X-axis direction, while the second reference pixel pitch can be defined as a distance between centers of adjacent pixels in the Y-axis direction.

In one example, a distance between centers of sub-pixels SP constituting a unit pixel in the X-axis direction can be defined as a first reference sub-pixel pitch. A distance between centers of sub-pixels SP constituting a unit pixel in the Y-axis direction can be defined as a second reference sub-pixel pitch In the display device 100 including the light-emitting element 140, a width of the non-display area NA can be smaller than each of the first and second reference pixel pitches or each of the first and second reference sub-pixel pitches. When a multi-screen display apparatus is composed of the display devices 100 having the non-display area NA having the width equal to or smaller than each of the first and second reference pixel pitches or each of the first and second reference sub-pixel pitches, the multi-screen display apparatus having substantially no bezel area can be implemented.

As described above, in order to implement the multi-screen display apparatus with substantially no or minimal bezel area, the display device 100 can be configured such that each of the first and second reference pixel pitches and each of the first and second reference sub-pixel pitches can be kept constant in the display area AA. Alternatively, the display area AA can be divided into a plurality of zones, and each of the first and second reference pixel pitches and each of the first and second reference sub-pixel pitches in one zone can be different from each of the first and second reference pixel pitches and each of the first and second reference sub-pixel pitches in another zone, more specifically, each of the first and second reference pixel pitches and each of the first and second reference sub-pixel pitches in a zone adjacent to the non-display area NA can be larger than each of the first and second reference pixel pitches and each of the first and second reference sub-pixel pitches in each of other zones, such that a size of the bezel area can be much smaller than each of the first and second reference pixel pitches and each of the first and second reference sub-pixel pitches.

In the display device 100 having different pixel pitches in the different zones in this way, distortion of an image can occur. Therefore, the image processing can be performed such that image data can be sampled in different manners in the different zones in consideration of the differently set pixel pitches, thereby minimizing the image distortion while minimizing the bezel area.

However, in minimizing the non-display area NA, a minimum area for a pad area for connection with a circuit unit that can transmit and receive power and data signals to and from the unit pixel with the micro-LED element 140, and a driver IC are required.

Referring to FIG. 2, a configuration and a circuit structure of the sub-pixel SP constituting the unit pixel of the display device 100 will be described. Pixel driving lines are provided on a front surface of the substrate 110 to supply necessary signals to the plurality of sub-pixels SP. The pixel driving lines according to an embodiment of the present disclosure can include a plurality of gate lines GL, a plurality of data lines DL, a plurality of driving power lines DPL, and a plurality of common power lines CPL.

The plurality of gate lines GL are provided on the front surface of the substrate 110, and are arranged so as to be spaced apart from each other by a regular spacing along a second horizontal axis direction (Y-axis direction) of the substrate 110 while extending along a first horizontal axis direction (X-axis direction) of the substrate 110.

The plurality of data lines DL are provided on the front surface of the substrate 110 so as to intersect the plurality of gate lines GL, and extend along the second horizontal axis direction (Y-axis direction) of the substrate 110 and are arranged so as to be spaced apart from each other by a regular spacing along the first horizontal axis direction (X-axis direction).

The plurality of driving power lines DPL are provided on the substrate 110 and extend in parallel with each of plurality of data lines DL, and extend along the second horizontal axis direction (Y-axis direction) of the substrate 110 and are arranged so as to be spaced apart from each other by a regular spacing along the first horizontal axis direction (X-axis direction). The plurality of driving power lines DPL and the plurality of data lines DL can be formed together. The plurality of driving power lines DPL supply externally provided driving power to adjacent sub-pixels SP.

The plurality of common power lines CPL are provided on the substrate 110 and extend in parallel with the plurality of gate lines GL and are arranged so as to be spaced apart from each other by a regular spacing along a second horizontal axis direction (Y-axis direction) of the substrate 110 while extending along a first horizontal axis direction (X-axis direction) of the substrate 110. The plurality of common power lines CPL and the plurality of gate line GL can be formed together. The plurality of common power lines CPL can supply common power provided from an external source to adjacent sub-pixels SP.

Each of the plurality of sub-pixels SP is disposed in a sub-pixel area defined by the gate line GL and the data line DL. Each of the plurality of sub-pixels SP can be defined as a minimum unit area in which light is actually emitted.

At least 3 sub-pixels SP adjacent to each other can constitute one unit pixel for color display. For example, one unit pixel can include sub-pixels SP emitting light of red (R), green (G), and blue (B) and adjacent to each other along the first horizontal axis direction (X-axis direction), and can further include a sub-pixel SP emitting light of white (W) to improve luminance.

Optionally, each of the plurality of driving power lines DPL can be disposed in each of the plurality of unit pixels. In this case, at least three sub-pixels SP constituting each unit pixel share one driving power line DPL. Accordingly, the number of driving power lines for driving the sub-pixels SP can be reduced, and thus an opening of each unit pixel can be increased or a size of each unit pixel can be reduced by the number of driving power lines that can be reduced.

Each of the plurality of sub-pixels SP according to an embodiment of the present disclosure includes a driver circuit PC and the light-emitting element 140.

The driver circuit PC is disposed in a circuit area defined in each sub-pixel SP and is connected to the gate line GL, the data line DL, and the driving power line DPL adjacent thereto. This driver circuit PC controls the current flowing to the light-emitting element 140 according to a data signal from the data line DL in response to a scan pulse from the gate line GL, based on the driving power supplied from the driving power line DPL. The driver circuit PC according to an embodiment of the present disclosure includes a switching transistor T1, a driving transistor T2, and a capacitor Cst.

The switching transistor T1 includes a gate electrode connected to the gate line GL, a first electrode connected to the data line DL, and a second electrode connected to a gate electrode N1 of the driving transistor T2. In this regard, the first and second electrodes of the switching transistor T1 can respectively be the source electrode and the drain electrode or the drain electrode and the source electrode depending on a direction of the current. This switching transistor T1 is turned on based on the scan pulse supplied to the gate line GL to supply the data signal supplied from the data line DL to the driving transistor T2.

The driving transistor T2 is turned on based on a voltage supplied from the switching transistor T1 and/or a voltage of the capacitor Cst to control an amount of current flowing from the driving power line DPL to the light-emitting element 140. To this end, the driving transistor T2 according to an embodiment of the present disclosure can include the gate electrode N1 connected to the second electrode of the switching transistor T1, a drain electrode connected to the driving power line DPL, and a source electrode connected to the light-emitting element 140. The driving transistor T2 controls a data current flowing from the driving power line DPL to the light-emitting element 140 based on the data signal supplied from the switching transistor T1 to control light-emission of the light-emitting element 140.

The capacitor Cst is disposed in an overlapping area between the gate electrode N1 and the source electrode of the driving transistor T2 and stores therein a voltage corresponding to the data signal supplied to the gate electrode of the driving transistor T2. The driving transistor T2 is turned on with the stored voltage in the capacitor Cst.

Optionally, the driver circuit PC can further include at least one compensation transistor for compensating for change in a threshold voltage of the driving transistor T2. Furthermore, the driver circuit PC can further include at least one auxiliary capacitor. This driver circuit PC can additionally receive a compensation power such as initialization voltage according to the number of transistors and the auxiliary capacitors. Therefore, the driver circuit PC according to an embodiment of the present disclosure drives the light-emitting element 140 in the same current driving manner as a manner in which each sub-pixel of the organic light-emitting display device operates. Thus, the driver circuit PC according to an embodiment of the present disclosure can be changed to a known pixel circuit of the organic light-emitting display device.

The light-emitting element 140 is mounted in each of the plurality of sub-pixels SP. This light-emitting element 140 is electrically connected to the driver circuit PC of the corresponding sub-pixel SP and the common power line CPL, and emits light based on current flowing from the driver circuit PC, for example, the driving transistor T2 to the common power line CPL. The light-emitting element 140 according to an embodiment of the present disclosure can be embodied as a light-emitting element or a light-emitting diode chip that emits one of red light, green light, blue light, and white light. In this regard, the light-emitting diode chip can have a scale of 1 to 100 micrometers (μm). However, the present disclosure is not limited thereto. The light-emitting diode chip can have a size smaller than a size of the light-emitting area other than the circuit area occupied with the driver circuit PC int the sub-pixel area.

Figure 3:
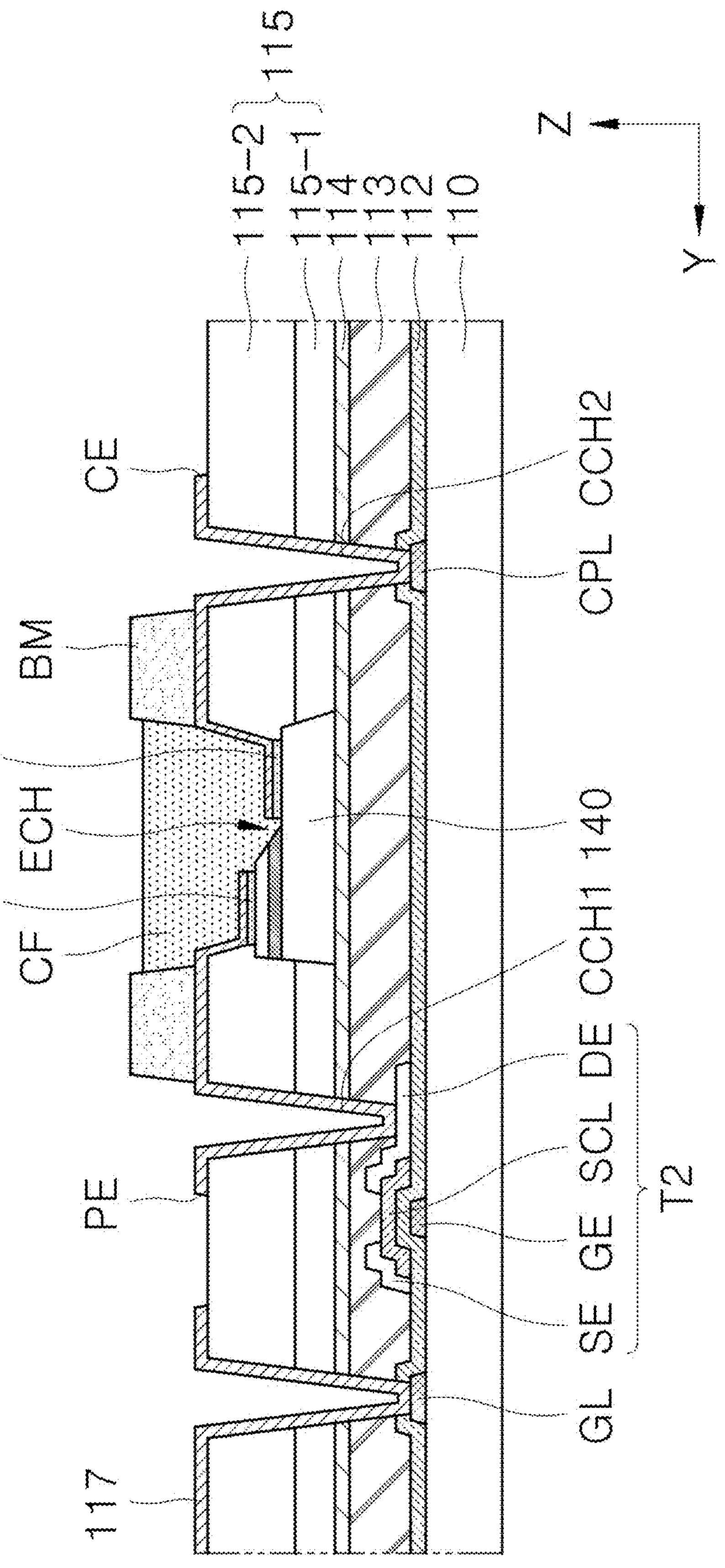
FIG. 3 is a schematic cross-sectional view along a cutting line 3 of FIG. 1 for illustrating a sub-pixel in which a light-emitting element according to an embodiment of the present disclosure is used.

FIG. 3 is a schematic cross-sectional view taken along a cutting-line 3-3 of FIG. 1 for illustrating a sub-pixel in which a light-emitting element according to an embodiment of the present disclosure is disposed. Hereinafter, the description is made with reference to FIG. 2 and FIG. 3, but the description is made in conjunction with the previous drawings.

Referring to FIG. 3, each of the sub-pixels SP of the display device 100 according to an embodiment of the present disclosure includes a protective layer 113, the light-emitting element 140, a planarization layer 115 (115-1 and 115-2), a pixel electrode PE, and a common electrode CE.

First, although a thickness of the substrate 110 is shown as being relatively small in FIG. 3, the thickness of the substrate 110 can actually be relatively larger than a total thickness of a layer structure provided on the substrate 110, and can be composed of a plurality of layers or a laminate of a plurality of substrates.

The driver circuit PC includes the switching transistor T1, the driving transistor T2, and the capacitor Cst. Since this driver circuit PC is the same as described above, a detailed description thereof will be omitted, and a structure of the driving transistor T2 will be described below by way of example.

The driving transistor T2 includes the gate electrode GE, a semiconductor layer SCL, a source electrode SE, and a drain electrode DE. Hereinafter, the driving transistor T2 can be referred to as 'a second transistor T2'.

The gate electrode GE and the gate line GL is disposed on the substrate 110 and in the same layer. The gate electrode GE is covered with a gate insulating layer 112. The gate insulating layer 112 can be composed of a single layer or a plurality of layers made of an inorganic material such as silicon oxide (SiOx), silicon nitride (SiNx), or the like.

The semiconductor layer SCL is disposed in a preset pattern (or an island shape) and on the gate insulating layer 112 so as to overlap with the gate electrode GE. The semiconductor layer SCL can be made of a semiconductor material including amorphous silicon, polycrystalline silicon, oxide, and an organic material.

The source electrode SE is disposed to overlap one side of the semiconductor layer SCL. The source electrode SE, the data line DL and the driving power line DPL are disposed in the same layer.

The drain electrode DE overlaps the other side of the semiconductor layer SCL and is spaced apart from the source electrode SE. The drain electrode DE and the source electrode SE are disposed in the same layer, while the drain electrode DE branches or protrudes from the driving power line DPL adjacent thereto.

Additionally, in FIG. 3, the switching transistor T1 constituting the driver circuit PC has the same structure as that of the driving transistor T2. In this regard, the gate electrode of the switching transistor T1 branches or protrudes from the gate line GL, the first electrode of the switching transistor T1 branches or protrudes from the data line DL, and the second electrode of the switching transistor T1 is connected to the gate electrode GE of the driving transistor T2 via a via hole formed in the gate insulating layer 112.

The protective layer 113 is disposed over an entirety of a top surface of the substrate 110 so as to cover the sub-pixel SP, for example, the driver circuit PC. This protective layer 113 provides a flat surface while protecting the driver circuit PC. The protective layer 113 according to an embodiment can be made of an organic material such as benzocyclobutene or photo acryl. In one example, the protective layer 113 can be made of the photo acryl for convenience in terms of a process.

The light-emitting element 140 according to an embodiment of the present disclosure can be bonded to the protective layer 113 using an adhesive member 114. Alternatively, the light-emitting element 140 can be received in a recess defined in the protective layer 113. The recess defined in the protective layer 113 can have an inclined side surface to direct the light emitted from the micro-LED element 140 in a specific direction to improve light-emitting efficiency.

The light-emitting element 140 is electrically connected to the driver circuit PC and the common power line CPL and thus emit light based on current flowing from the driver circuit PC, for example, the driving transistor T2 to the common power line CPL. The light-emitting element 140 according to an embodiment of the present disclosure includes a light-emissive layer EL, a first electrode (or an anode terminal) E1, and a second electrode (or a cathode terminal) E2.

The light-emitting element 140 emits light based on recombination of electrons and holes according to a current flowing between the first electrode E1 and the second electrode E2.

The planarization layer 115 (115-1 and 115-2) is disposed on the protective layer 113 so as to cover the light-emitting element 140. For example, the planarization layer 115 (115-1 and 115-2) is disposed on the protective layer 113 so as to have a thickness sufficient to cover an entirety of a top surface of the protective layer 113 except for the micro-LED element 140.

The planarization layer 115 (115-1 and 115-2) can be composed of a single layer. Alternatively, the planarization layer 115 (115-1 and 115-2 can be composed of first and second planarization layers 115-1 and 115-2 as shown.

The planarization layers 115-1 and 115-2 can provide a planarized surface on the protective layer 113. Further, the planarization layers 115-1 and 115-2 can serve to fix the position of the light-emitting element 140.

The pixel electrode PE connects the first electrode E1 of the light-emitting element 140 to the drain electrode DE of the driving transistor T2. Alternatively, the pixel electrode PE can connect the first electrode E1 of the light-emitting element 140 to the source electrode SE of the driving transistor T2 according to the configuration of the driving transistor T2. The pixel electrode PE can be defined as an anode electrode.

The pixel electrode PE according to an embodiment of the present disclosure is located on a portion of the planarization layer 115-1 and 115-2 overlapping the first electrode E1 of the light-emitting element 140 and the driving transistor T2. The pixel electrode PE is electrically connected to the drain electrode DE or the source electrode SE of the driving transistor T2 via a first circuit contact-hole CCH1 extending through the protective layer 113 and the planarization layers 115-1 and 115-2 and is electrically connected to the first electrode E1 of the light-emitting element 140 via an electrode contact-hole ECH formed in the planarization layers 115-1 and 115-2. Accordingly, the first electrode E1 of the light-emitting element 140 is electrically connected to the drain electrode DE or the source electrode SE of the driving transistor T2 via the pixel electrode PE.

Regarding a connection relationship of each of the source electrode SE and the drain electrode DE, it is shown that the drain electrode DE is connected to the pixel electrode PE. However, a configuration in which the pixel electrode PE and the source electrode SE are connected to each other can be considered. The selection of one of the former and latter configurations can be a design choice by those skilled in the art.

The pixel electrode PE can be made of a transparent conductive material when the display device 100 operates in a top emission scheme, or can be made of a light reflective conductive material when the display device 100 operates in a bottom emission scheme. In this regard, the transparent conductive material can be ITO (Indium Tin Oxide) or IZO (Indium Zinc Oxide), but is not limited thereto. The light reflective conductive material can be Al, Ag, Au, Pt, or Cu, but is not limited thereto. The pixel electrode PE made of a light-reflective conductive material can be composed of a single layer including a light-reflective conductive material or a stack of multiple layers including a light-reflective conductive material.

The common electrode CE electrically connects the second electrode E2 of the light-emitting element 140 and the common power line CPL to each other, and can be defined as a cathode electrode. The common electrode CE is disposed on a portion of the planarization layer 115-1 and 115-2 overlapping each of the common power line CPL and the second electrode E2 of the light-emitting element 140. In this regard, the common electrode CE can be made of the same material as that of the pixel electrode PE.

One side of the common electrode CE according to an embodiment of the present disclosure is electrically connected to the common power line CPL via a second circuit contact-hole CCH2 extending through a portion of each of the gate insulating layer 112 and the protective layer 113 and the planarization layers 115-1 and 115-2 overlapping the common power line CPL.

The other side of the common electrode CE according to an embodiment of the present disclosure is electrically connected to the second electrode E2 of the light-emitting element 140 via the electrode contact-hole ECH defined in the planarization layers 115-1 and 115-2 so as to overlap the second electrode E2 of the light-emitting element 140. Accordingly, the second electrode E2 of the light-emitting element 140 is electrically connected to the common power line CPL via the common electrode CE.

The pixel electrode PE and the common electrode CE according to an embodiment of the present disclosure can be formed simultaneously by performing a deposition process of depositing an electrode material on the planarization layers 115-1 and 115-2 having the first and second circuit contact-holes CCH1 and CCH2, and the electrode contact-hole ECH defined therein, and performing an electrode patterning process using a photolithography process and an etching process.

Accordingly, in one embodiment of the present disclosure, the pixel electrode PE and the common electrode CE connecting the light-emitting element 140 to the driver circuit PC can be simultaneously formed. Thus, an electrode connection process can be simplified, and a process time for connecting the light-emitting element 140 and the driver circuit PC to each other can be greatly reduced, thereby improving the productivity of the display device.

In the display device 100 according to an embodiment of the present disclosure, the light-emitting element 140 mounted in each sub-pixel SP can be fixedly disposed using the adhesive member 114.

The adhesive member 114 primarily fixes the light-emitting element 140 of each sub-pixel SP. The adhesive member 114 according to an embodiment of the present disclosure is in contact with a bottom of the light-emitting element 140, and minimizes displacement of the light-emitting element

140 in the mounting process of the light-emitting element 140, and at the same time, allows the light-emitting element 140 to be smoothly removed from an intermediate substrate used for transfer thereof, such that defects in the transfer process of the light-emitting element 140 can be minimized.

The adhesive member 114 according to an embodiment of the present disclosure can be applied in a dot manner in each sub-pixel SP and then can spread due to a pressing force applied in a mounting process of the light-emitting element, and thus can adhere to the bottom of the light-emitting element 140. Accordingly, the position of the light-emitting element 140 can be first fixed by the adhesive member 114. Therefore, according to an embodiment of the present disclosure, the mounting process of the light-emitting element is performed in a manner in which the light-emitting element 140 is simply adhered to the surface, so that the mounting process time of the light-emitting element can be greatly reduced.

Alternatively, the adhesive member 114 is interposed between the protective layer 113 and the planarization layer 115-1 and 115-2, and is interposed between the light-emitting element 140 and the protective layer 113. The adhesive member 114 according to this alternative example is coated on the entirety of the top surface of the protective layer 113 so as to have a constant thickness, and then a portion of the adhesive member 114 coated on a portion of the protective layer 113 where each of the contact-holes is to be defined is removed when each of the contact-holes is formed. Accordingly, according to one embodiment of the present disclosure, the adhesive member 114 is coated on the entirety of the top surface of the protective layer 113 so as to have a constant thickness immediately before the mounting process of the light-emitting element, such that the process time for disposing the adhesive member 114 can be shortened.

In one embodiment of the present disclosure, the adhesive member 114 is disposed on the entirety of the top surface of the protective layer 113. Thus, the planarization layer 115-1 and 115-2 according to an embodiment of the present disclosure is disposed to cover the adhesive member 114.

In still another embodiment of the present disclosure, the recess for separately accommodating therein the light-emitting element 140 can be defined in the protective layer 113. The adhesive member 114 can be disposed along an exposed surface of the recess. The light-emitting element 140 can be received in the recess and can be fixedly disposed therein via the adhesive member 114. However, the recess for accommodating therein the light-emitting element 140 can be omitted according to various process conditions for implementing the display device.

The mounting process of the light-emitting element according to an embodiment of the present disclosure can include a mounting process of selected one among elements emitting light of red, green, blue, and white in each sub-pixel SP. In this regard, a color filter layer as a color conversion layer can be disposed on the mounted light-emitting element.

In this case, the substrate 110 includes the color filter layer overlapping each sub-pixel SP and a black matrix BM.

The light-emitting element according to an embodiment of the present disclosure can be embodied as a blue (B) micro LED element 140 that emits light of a blue wavelength. Quantum dot particles can be dispersed in the color filter layer used as a color conversion layer.

Due to use of a single wavelength light-emitting element 140, there is no need for a process of transferring light-emitting elements 140 emitting light of different wavelengths, respectively. Rather, the light-emitting elements 140 emitting light of the same wavelength can be used. In this regard, the color filter layer for color conversion can be used, wherein the quantum dot particles can be added to the color filter layer to maintain light efficiency. Thus, the display device 100 can be manufactured in a simplified process.

Due to the simplified transfer process, defects that can occur in the sub-pixel SP can be minimized. A unit pixel is composed of a plurality of sub-pixels SP. Thus, the color filter layer can be implemented using any one sub-pixel SP constituting the unit pixel. Thus, when a defect occurs in one sub-pixel SP among the plurality of sub-pixels SP, the defective sub-pixel SP can be repaired.

Figure 4A:
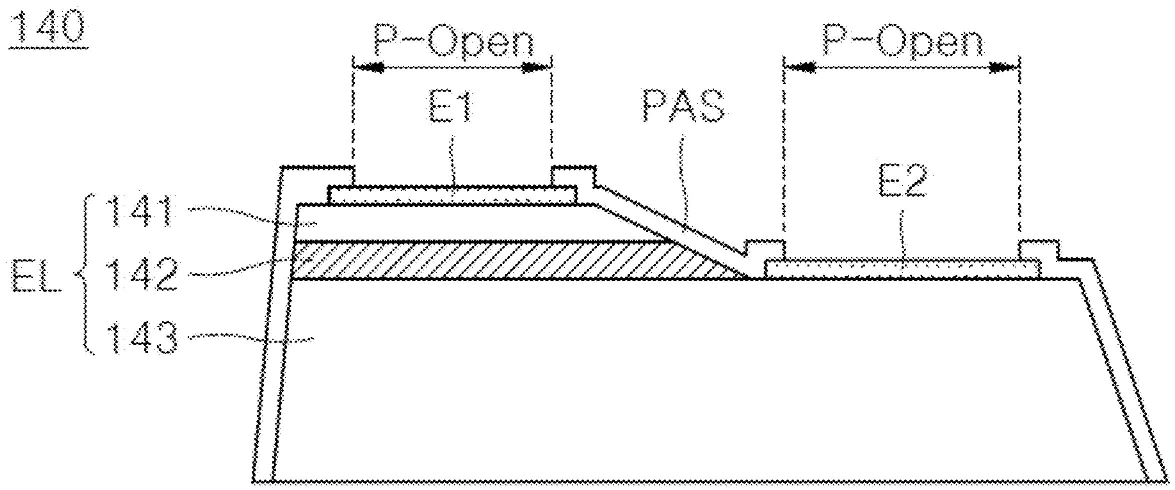
FIG. 4A is a schematic diagram for illustrating a light-emitting element according to an embodiment of the present disclosure.

FIG. 4A is a schematic diagram for illustrating a light-emitting element according to an embodiment of the present disclosure.

Referring to FIG. 4A, the light-emitting element 140 according to an embodiment of the present disclosure can include a light-emissive layer EL, the first electrode E1, the second electrode E2, and an insulating film PAS. The light-emissive layer EL can include a first semiconductor layer 141, an active layer 142, and a second semiconductor layer 143. The light-emitting element 140 emits light based on recombination of electrons and holes according to a current flowing between the first electrode E1 and the second electrode E2.

The first semiconductor layer 141 can be a p-type semiconductor layer, and the second semiconductor layer 143 can be an n-type semiconductor layer. Alternatively, the first semiconductor layer 141 can be a n-type semiconductor layer, and the second semiconductor layer 143 can be a p-type semiconductor layer. However, for convenience of description, an example in which the first semiconductor layer 141 is a p-type semiconductor layer, and the second semiconductor layer 143 is an n-type semiconductor layer will be described. In addition, the first electrode E1 and the second electrode E2 can be referred to as a p-type electrode and an n-type electrode based on an electrical connection relationship between the first electrode E1 and the second electrode E2 and the first semiconductor layer 141 and the second semiconductor layer 143. Alternatively, the first electrode E1 and the second electrode E2 can be referred to as a n-type electrode and a p-type electrode. However, for convenience of description, an example in which the first electrode E1 and the second electrode E2 are a p-type electrode and an n-type electrode, respectively will be described.

The first semiconductor layer 141 is provided on the active layer 142 and provides holes to the active layer 142. The first semiconductor layer 141 according to an embodiment of the present disclosure can be made of a p-GaN-based semiconductor material, and the p-GaN-based semiconductor material can include GaN, AlGaN, InGaN, or AlInGaN. In this regard, Mg, Zn, or Be can be used as an impurity used for doping of the first semiconductor layer 141.

The second semiconductor layer 143 provides electrons to the active layer 142. The second semiconductor layer 143 according to an embodiment of the present disclosure can be made of an n-GaN-based semiconductor material, and the n-GaN-based semiconductor material can include GaN, AlGaN, InGaN, or AlInGaN. In this regard, Si, Ge, Se, Te, or C can be used as an impurity used for doping of the second semiconductor layer 143.

The active layer 142 is provided on the second semiconductor layer 143. The active layer 142 can include a multi-quantum well (MQW) structure having a well layer and a barrier layer having a higher band gap than that of the well layer. The active layer 142 according to an embodiment of the present disclosure can have a multi-quantum well structure such as InGaN/GaN.

The first electrode E1 is electrically connected to the first semiconductor layer 141, and is connected to the drain electrode DE or the source electrode SE of the driving transistor T2, and the second electrode E2 is connected to the common power line CPL.

The aforementioned first electrode E1 can be a p-type electrode and the second electrode E2 can be an n-type electrode. Whether the first electrode E1 is a p-type electrode and the second electrode E2 is an n-type electrode or the first electrode E1 is a n-type electrode and the second electrode E2 is an p-type electrode can be determined according to whether the corresponding electrode supplies electrons or holes, for example, whether the corresponding electrode is electrically connected to the p-type semiconductor layer or is connected to the n-type semiconductor layer. However, in the present disclosure, for convenience of description, an example in which the first electrode E1 and the second electrode E2 are a p-type electrode and an n-type electrode, respectively will be described.

Each of the first and second electrodes E1 and E2 according to an embodiment of the present disclosure can include one or more of metal materials such as Au, W, Pt, Si, Ir, Ag, Cu, Ni, Ti, or Cr and alloys thereof. Each of the first electrode E1 and the second electrode E2 according to another embodiment can be made of a transparent conductive material, and the transparent conductive material can include ITO (Indium Tin Oxide) or IZO (Indium Zinc Oxide). However, the present disclosure is not limited thereto.

The insulating film PAS is disposed to cover an outer surface of the light-emitting element 140 and has an insulating film open area P-Open defined therein to expose at least a portion of each of the first electrode E1 and the second electrode E2. The insulating film PAS can be made of a material such as SiNx or SiOx and is disposed to cover the active layer 142.

The insulating film PAS prevents unintended electrical connection between elements when the first electrode E1 and the second electrode E2 in the light-emitting element 140 and the pixel electrode PE or the common electrode CE are electrically connected to each other.

Additionally, the second semiconductor layer 143, the active layer 142, and the first semiconductor layer 141 can be sequentially stacked on a semiconductor substrate to constitute the light-emitting element 140. In this regard, the semiconductor substrate includes a sapphire substrate, or a silicon substrate. This semiconductor substrate can be used as a growth substrate for growing each of the second semiconductor layer 143, the active layer 142, and the first semiconductor layer 141, and then can be removed from the second semiconductor layer 143 in a substrate separation process. In this regard, the substrate separation process can include a laser lift off process or a chemical lift off process. Accordingly, as the semiconductor substrate for growth is removed from the light-emitting element 140, the light-emitting element 140 can have a relatively thin thickness, and thus can be accommodated in each sub-pixel SP.

Figure 4B:
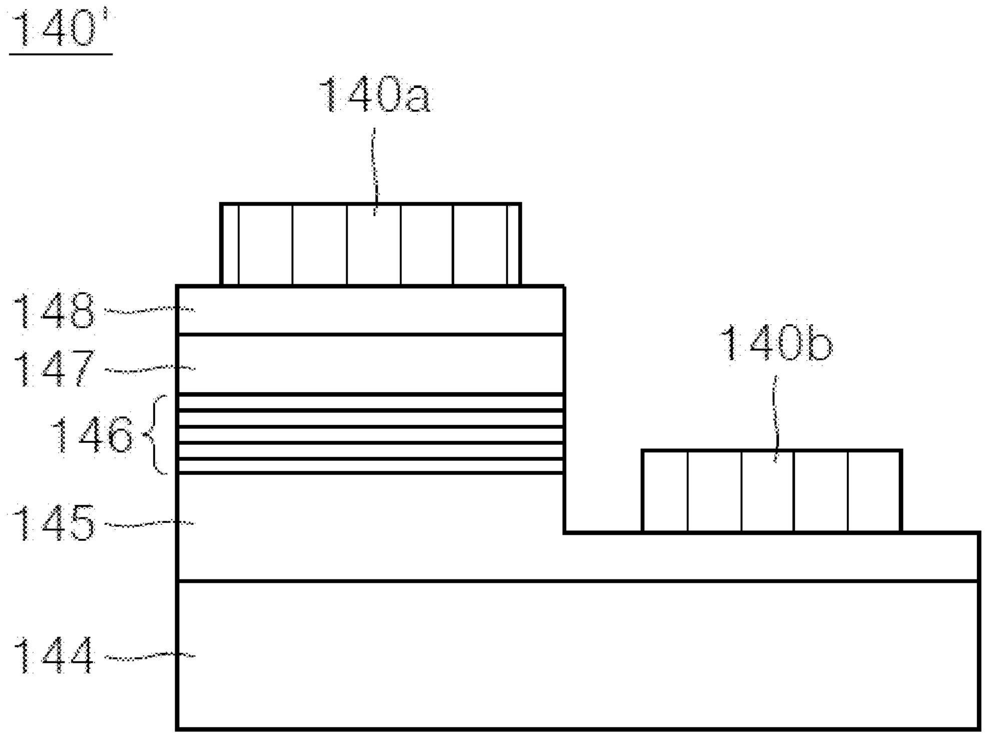
FIG. 4B is a schematic diagram for illustrating a light-emitting element according to another embodiment of the present disclosure.

FIG. 4B is a schematic diagram for illustrating a light-emitting element according to another embodiment of the present disclosure.

Referring to FIG. 4B, a light-emitting element 140' according to another embodiment of the present disclosure includes an undoped GaN layer 144, an n-type GaN layer 145 disposed on the undoped GaN layer 144, an active layer 146 disposed on the n-type GaN layer 145 and having a MQW (Multi-Quantum-Well) structure, a p-type GaN layer 147 disposed on the active layer 146, an ohmic contact layer 148 made of a transparent conductive material and disposed on the p-type GaN layer 147, a p-type electrode 140*a* in contact with a portion of the ohmic contact layer 148, and an n-type electrode 140*b*. In this regard, the n-type electrode 140*b* is in contact with a portion of the n-type GaN layer 145 exposed by etching a portion of each of the active layer 146, the p-type GaN layer 147, and the ohmic contact layer 148.

The n-type GaN layer 145 can be a layer for supplying electrons to the active layer 146 and can be formed by doping the GaN semiconductor layer with n-type impurities such as Si.

The active layer 146 can be a layer in which injected electrons and holes are combined with each other to emit light. In FIG. 4B, the multi-quantum well structure of the active layer 146 includes a plurality of barrier layers and a plurality of well layers alternately arranged with each other, wherein the well layer can be composed of an InGaN layer and the barrier layer can be composed of a GaN layer. However, the present disclosure is not limited thereto.

The p-type GaN layer 147 can be a layer for injecting holes into the active layer 146, and can be formed by doping the GaN semiconductor layer with p-type impurities such as Mg, Zn, and Be.

The ohmic contact layer 148 can achieve ohmic contact between the p-type GaN layer 147 and the p-type electrode 140*a*, and can be made of a transparent metal oxide such as ITO (Indium Tin Oxide), IGZO (Indium Gallium Zinc Oxide), and IZO (Indium Zinc Oxide).

Each of the p-type electrode 140*a* and the n-type electrode 140*b* can be composed of a single layer or a plurality of layers made of at least one of Ni, Au, Pt, Ti, Al, and Cr and an alloy thereof.

As the voltage is applied to the p-type electrode 140*a* and the n-type electrode 140*b* in the light-emitting element 140' having this structure, electrons and holes are transferred from the n-type GaN layer 145 and the p-type GaN layer 147 to the active layer 146, respectively. Thus, an exciton is generated in the active layer 146. As this exciton decays, light corresponding to the energy difference between the LUMO (Lowest Unoccupied Molecular Orbital) level and the HOMO (Highest Occupied Molecular Orbital) level of the light-emissive layer is generated and emitted to the outside.

In this regard, the wavelength of light emitted from the light-emitting element 140' can be adjusted by adjusting a thickness of the barrier layer of the multi-quantum well structure of the active layer 146.

The light-emitting element 140' can be formed to have a size of about 10 to 100 μm. The light-emitting element 140' can be fabricated by forming a buffer layer on a substrate 110 and growing a GaN thin-film on the buffer layer. In this regard, sapphire, silicon (Si), GaN, silicon carbide (SiC), gallium arsenide (GaAs), zinc oxide (ZnO), etc. can be used as a material of the substrate for the growth of the GaN thin-film.

Further, when the substrate for growing the GaN thin-film is made of not GaN but a material other than GaN, lattice mismatch can occur when the n-type GaN layer 145 as an epitaxial layer is directly grown on the substrate. In this regard, the buffer layer is provided to prevent quality deterioration due to the lattice mismatch and is made of AlN or GaN.

The n-type GaN layer 145 can be formed by growing the GaN layer 144 not doped with impurities and then doping an n-type impurity such as silicon (Si) into a top portion of the undoped GaN layer. Further, the p-type GaN layer 147 can be formed by growing an undoped GaN thin-film and then doping p-type impurities such as Mg, Zn, and Be into the undoped GaN thin-film.

In FIG. 4B, the light-emitting element 140' having a specific structure can be disposed on top of the protective layer 113. However, the present disclosure is not limited to the light-emitting element 140' of the specific structure. Light-emitting elements of various structures, such as a vertical-type light-emitting element and a horizontal-type light-emitting element can be applied to the display device.

Figure 5:
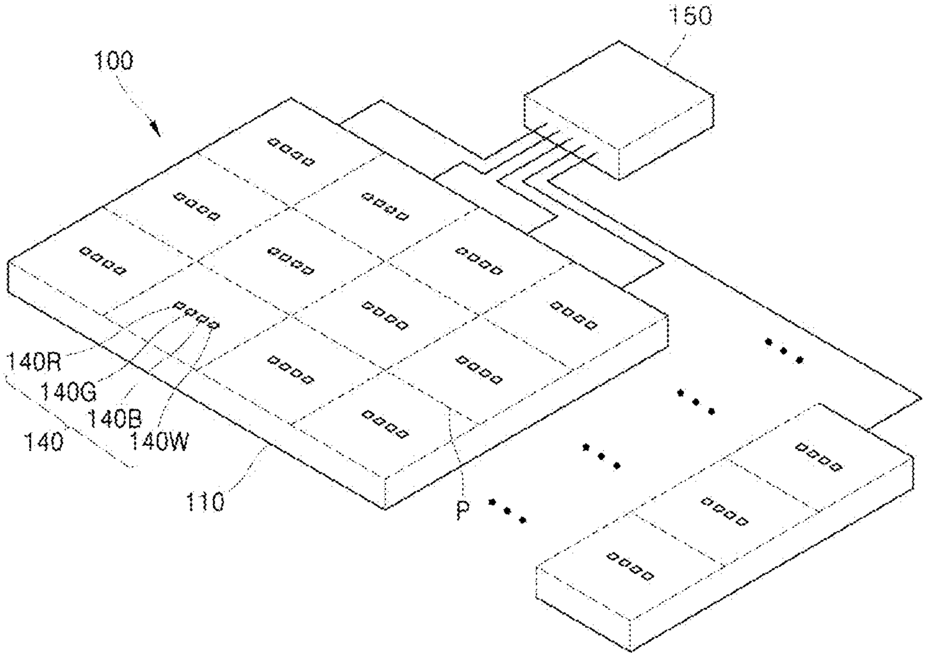
FIG. 5 is a plan view schematically illustrating a display device according to an embodiment of the present disclosure.

FIG. 5 is a plan view schematically illustrating a display device according to an embodiment of the present disclosure.

Referring to FIG. 5, the display device 100 according to an embodiment of the present disclosure can include the display panel 110 and a driver 150 controlling the display panel 110.

The display panel 110 can include at least one of a first sub-pixel, a second sub-pixel, a third sub-pixel, and a fourth sub-pixel.

The first sub-pixel to the fourth sub-pixel can be configured to emit light of different colors.

For example, the first sub-pixel can emit red (R) light, the second sub-pixel can emit green (G) light, the third sub-pixel can emit blue (B) light, and the fourth sub-pixel can emit white (W) light.

At least three sub-pixels selected from among the first sub-pixel (R), the second sub-pixel (G), the third sub-pixel (B), and the fourth sub-pixel (W) can emit red (R), blue (B), and green (G) light, respectively.

The first sub-pixel (R), the second sub-pixel (G), the third sub-pixel (B), and the fourth sub-pixel (W) can include micro-LED elements 140R, 140G, 140B, and 140W, respectively. Each of the micro-LED elements 140R, 140G, 140B, and 140W can be referred to as the micro-LED element 140. The micro-LED element 140 can be referred to as 'a micro-LED chip 140'. Therefore, each of the first sub-pixel R to the fourth sub-pixel W can include the micro-LED element 140 or the micro-LED chip 140.

The driver 150 can control light-emission operation of at least one of the first sub-pixel to the fourth sub-pixel (R), (G), (B), and (W).

In this regard, when the sub-pixel includes the light-emitting element 140, the driver 150 can be embodied as, for example, 'a micro driver 150' which controls the light-emission of at least one light-emitting element 140.

Each single driver 150 can be disposed in each light-emitting area composed of for example, several hundreds of the sub-pixels (R), (G), (B), and (W).

Alternatively, each of the first sub-pixel to the fourth sub-pixel (R), (G), (B), and (W) can include an organic light-emitting diode (OLED).

The driver 150 can be controlled so that a data voltage set in a first control mode is applied to at least one sub-pixel for a pulse width set in a second control mode. The present disclosure is not limited thereto. For example, the driver 150 can apply the data voltage set during a first control period to each sub-pixel to emit light with a pulse width set during a second control period.

The first control mode (or the first control period) represents a high luminance operation mode of at least one sub-pixel, and is a mode in which a pulse width is fixed to a specific value and a current value and a data voltage value for at least one sub-pixel are variable.

In the first control mode, the driver 150 can be controlled such that the pulse width is fixed to the specific value, the current value of at least one sub-pixel is a specific value of about 30 to 60 milliamps mA, and the data voltage value is a specific value in range of about 1 to 2 volts.

The second control mode (or the second control period) represents a low luminance operation mode of at least one sub-pixel. In the second control mode, each of the current value and the data voltage value for at least one sub-pixel is fixed to a specific value, and the pulse width is variable. The data voltage value set in the first control mode may be applied, in a fixed manner, to the at least one sub-pixels in the second control mode.

In the second control mode, the driver 150 can be controlled such that each of the data voltage value and the current value for at least one sub-pixel is fixed to a specific value, and the pulse width is a specific value in a range of 10 to 1,000 micro seconds (μs).

The display device 100 according to an embodiment of the present disclosure includes a plurality of light-emitting elements 140 mounted on the substrate 110.

The substrate 110 can be made of a transparent material such as glass, and a plurality of pixel areas P is formed thereon. The substrate 110 can be a TFT array substrate, and a thin-film transistor and various lines for driving the light-emitting element 140 can be formed in the pixel area P on the substrate 110. When the thin-film transistor is turned on, a driving signal input from the external source through the line is applied to the light-emitting element 140 so that the light-emitting element 140 emits light to realize an image.

In this regard, each pixel area P of the substrate 110 has three light-emitting elements 140R, 140G, and 140B emitting monochromatic light of colors (R), (G), and (B), respectively, for example. Upon application of the signal from the external source thereto, (R), (G), and (B) color light beams are emitted from the (R), (G), and (B) light-emitting elements 140R, 140G, and 140B, respectively, so that an image can be displayed.

The light-emitting elements 140R, 140G, and 140B are manufactured by a process separate from the TFT array process of the substrate 110. In general, in the organic light-emitting display device, both the TFT array and the organic light-emissive layer are formed in the photo process, whereas, in the display device 100 of the present disclosure, the thin-film transistor and various lines disposed on the substrate 110 are formed in a photo process, but the light-emitting elements 140R, 140G, and 140B are manufactured by a separate process therefrom, and the separately manufactured light-emitting elements 140R, 140G, and 140B are transferred onto the substrate 110.

The light-emitting element 140 can be embodied as a 10 to 100 μm sized LED. The light-emitting element 140 can be formed by growing a plurality of thin-films made of an inorganic material such as Al, Ga, N, P, As, etc. on a sapphire substrate or a silicon substrate, cutting the sapphire substrate or the silicon substrate and removing the sapphire substrate or the silicon substrate from the thin-films. In this way, the light-emitting element 140 can be formed in a micro size, and can be transferred to a flexible substrate made of plastic, making it possible to manufacture a flexible display device. Further, the light-emitting element 140 can be formed by growing the thin-film made of the inorganic material, unlike the organic light-emissive layer. Thus, the manufacturing process thereof is simplified and a yield is improved. Moreover, the individually separated light-emitting elements 140 are simply transferred onto the large-area substrate 110, such that a large-area display device can be manufactured. Moreover, the light-emitting element 140 made of the inorganic material has advantages of high luminance, a long lifespan, and a low cost compared to the LED made of the organic light-emitting material.

A plurality of gate lines and data lines can be disposed on the substrate 110 and can extend in directions intersecting each other to define the plurality of pixel areas P in a matrix manner. In this regard, the gate line and the data line can be connected to the light-emitting element 140, and ends of the gate line and the data line can provided with a gate pad and a data pad connected to an external component, respectively. When an external signal is applied to the light-emitting element 140 through the gate line and the data line, the light-emitting element 140 operates and emits light.

In one example, in the display device 100, each of the first sub-pixel (R) to the fourth sub-pixel (W) can be electrically connected to the driver circuit PC that drives light-emission of each sub-pixel as shown in FIG. 2.

Figure 6:
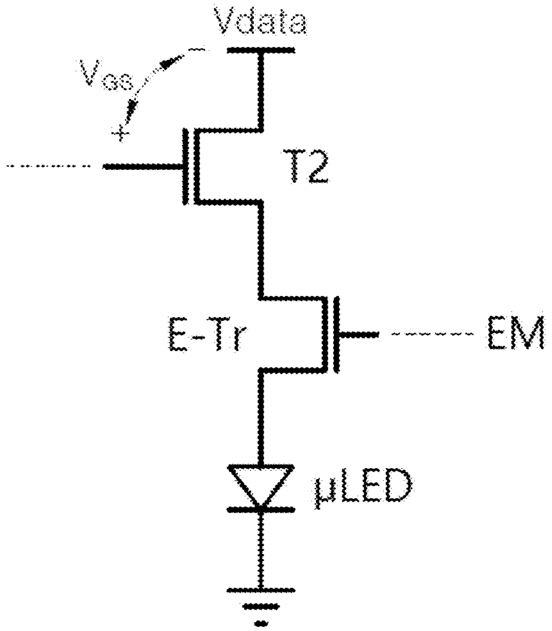
FIG. 6 is a diagram showing an example of a configuration of a driver circuit connected to a light-emitting element according to an embodiment of the present disclosure.

As shown in FIG. 6, each driver circuit PC can include a light-emission transistor E-Tr and a driving transistor T2. FIG. 6 is a diagram showing an example of a configuration of a driver circuit connected to a light-emitting element according to an embodiment of the present disclosure. In FIG. 6, the light-emitting element can be, for example, a micro-LED μLED. The light-emission transistor E-Tr can be connected to each micro-LED μLED. When the light-emission signal EM is applied to the gate electrode of the light-emission transistor E-Tr, the light-emission transistor E-Tr is turned on for a pulse width set in the second control mode. The driving transistor T2 can be connected to and disposed between the light-emission transistor E-Tr and the data voltage line, and switches the application of the data voltage Vdata set in the first control mode to each micro-LED μLED.

The data voltage Vdata line is connected to the first electrode of the driving transistor T2, while a first electrode of the light-emission transistor E-Tr is connected to the second electrode of the driving transistor T2. In this regard, when the first electrode is the source electrode, the second electrode can be the drain electrode, or when the first electrode is the drain electrode, the second electrode can be the source electrode. The gate electrode of the driving transistor T2 can be a plus electrode, and the first electrode thereof to which the data voltage Vdata line is connected can be a minus (−) electrode. A difference between the voltage of the gate electrode and the voltage of the first electrode of the driving transistor T2 can be VGS.

The first electrode of the light-emission transistor E-Tr is connected to the second electrode of the driving transistor T2. The micro-LED μLED connected to a ground is connected to the second electrode of the light-emission transistor E-Tr.

In one example, when the driver 150 receives the light-emission control command (or the light-emission control signal) from the timing controller TC, the driver 150 can turn on the driving transistor T2 so that the data voltage set in the first control mode (period) is applied, and can turn on the light-emission transistor E-Tr such that the light-emission transistor E-Tr can be turned on or switched for the set pulse width in the second control mode (period).

Further, a plurality of power lines, a plurality of scan lines, a reference voltage line, a data voltage line, and a light-emission control line can be disposed in the driver circuit PC.

In this regard, the plurality of power lines can include a first power line to which the first power is supplied; and a second power line to which the second power is supplied. In this regard, the first power can be a high-potential voltage, and the second power can be a low-potential voltage. A voltage value of the first power (VDD) can be greater than a voltage value of the second power (VSS).

In one example, each of the first sub-pixel (R) to the fourth sub-pixel (W) can be oriented in a flip scheme. In this regard, the flip scheme can refer to a scheme in which when the light-emitting element 140 is, for example, a micro-LED chip, first and second electrodes of the chip are turned upside down.

Each of the first sub-pixel (R) to the fourth sub-pixel (W) can be oriented in a lateral scheme. In this regard, the lateral scheme can refer to a scheme in which, when the light-emitting element 140 is, for example, a micro-LED chip, the first and second electrodes of the chip is not arranged in the vertical direction but is arranged in the horizontal direction.

A spare area corresponding to each sub-pixel can be disposed around each sub-pixel of the first sub-pixel (R) to the fourth sub-pixel (W).

A fifth sub-pixel emitting light of the same color as a color of light emitted from one of the first sub-pixel (R) to the fourth sub-pixel (W) can be disposed in each spare area.

Each fifth sub-pixel can emit light of the same color as a color of light emitted from the sub-pixel corresponding to each spare area.

In one example, the driver 150 can generate a coordinate value of each sub-pixel to emit light among the first sub-pixel (R) to the fourth sub-pixel (W) upon receiving an image signal. The driver 150 can apply the data voltage set in the first control mode to each sub-pixel to emit light corresponding to the generated coordinate value for a pulse width in the second control mode.

Figure 7:
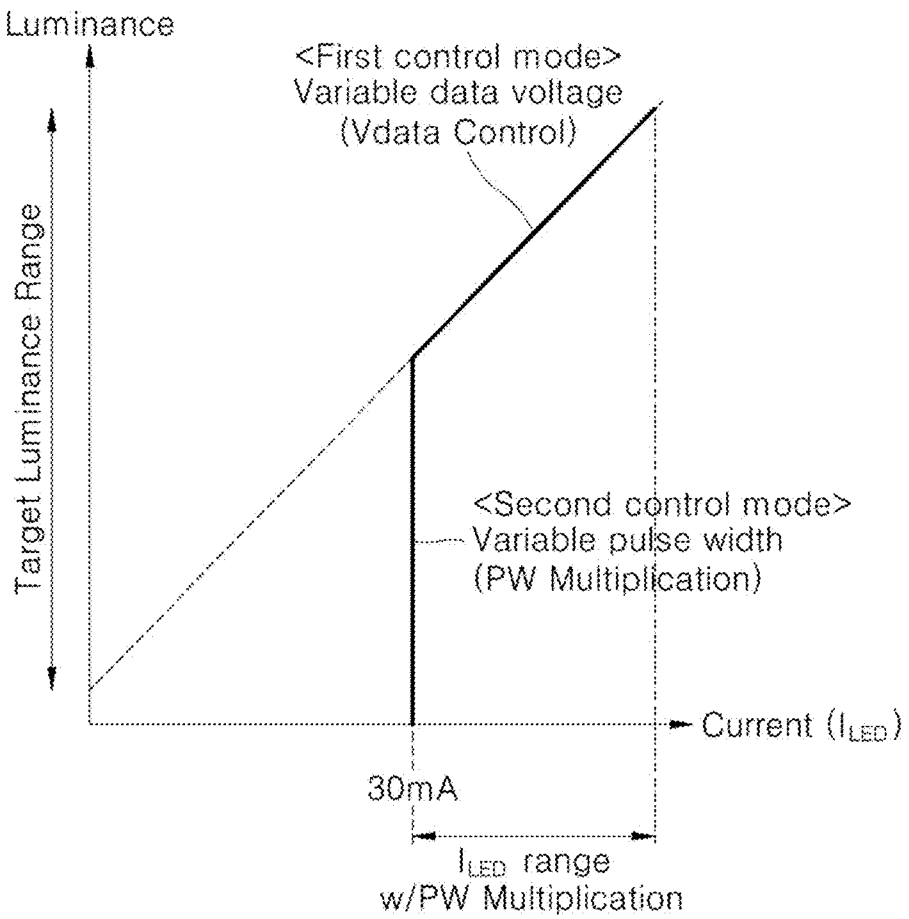
FIG. 7 is a diagram showing a control mode of a driver according to an embodiment of the present disclosure.

FIG. 7 is a diagram showing a control mode of a driver according to an embodiment of the present disclosure.

Referring to FIG. 7, the driver 150 according to an embodiment of the present disclosure can control light-emission and luminance of at least one sub-pixel in the first control mode (period) and the second control mode (period).

The first control mode (period) can refer to the high luminance operation mode of the light-emission of at least one sub-pixel. As shown in Table 1 below, in the first control mode, the driver 150 can fix the pulse width to a specific value of 1,000 micro seconds (μs), can vary the current value of the sub-pixel in a range of 30 to 60 milliampere (mA), and can vary the data voltage value of the sub-pixel in a range of 1 to 2 volt (V).

TABLE 1

| Luminance | Data voltage value (Vdata) | Current value ($I_{LED}$) | Pulse width |
|---|---|---|---|
| 1,000 nit | 2 V | 60 mA | 1,000 μs |
| 750 nit | 1.5 V | 45 mA | 1,000 μs |
| 500 nit | 1 V | 30 mA | 1,000 μs |

For example, the pulse width value is fixed to 1,000 microseconds (μs). In this case, when the driver 150 sets the current value of the sub-pixel to 60 milliampere (mA) and sets the data voltage value of the sub-pixel to 2 volts (V), the sub-pixel SP can emit light at luminance of 1,000 nit. Further, when the driver 150 sets the current value of the sub-pixel to 45 milliamps (mA) and the data voltage value of the sub-pixel to 1.5 volts (V), the sub-pixel SP can emit light at luminance of 750 nits. Further, when the driver 150 sets the current value of the sub-pixel to 30 milliampere (mA) and sets the data voltage value of the sub-pixel to 1 volt (V), the sub-pixel SP can emit light at luminance of 500 nit.

The second control mode (period) can refer to the low luminance operation mode of the light-emission of at least one sub-pixel. In the second control mode, the driver 150 can fix the current value of at least one sub-pixel to 30 mA, can fix the data voltage value of the sub-pixel to 1V, and can vary the pulse width in a range of from 10 to 1,000 us as shown in Table 2 below.

TABLE 2

| Luminance | Data voltage value (Vdata) | Current value ($I_{LED}$) | Pulse width |
|---|---|---|---|
| 500 nit | 1 V | 30 mA | 1,000 μs |
| 250 nit | 1 V | 30 mA | 500 μs |
| 1 nit | 1 V | 30 mA | 10 μs |

For example, when the driver 150 fixes the current value of the sub-pixel to 30 mA, fixes the data voltage value of the sub-pixel to 1 V, and sets the pulse width to 1,000 μs, the sub-pixel SP can emit light at luminance of 500 nit. Further, when the driver 150 sets the current value of the sub-pixel to 30 mA, sets the data voltage value of the sub-pixel to 1 V, and sets the pulse width to 500 μs, the sub-pixel SP emits light at luminance of 250 nits. Further, when the driver 150 sets the current value of the sub-pixel to 30 mA, sets the data voltage value of the sub-pixel to 1 V, and sets the pulse width to 10 μs, the sub-pixel SP can emit light at luminance of 1 nit.

FIG. 7 shows a case where when the sub-pixel SP starts to emit light, the driver 150 controls an initial current value to be 30 mA. In this regard, the driver 150 can vary only the pulse width in a range of 10 to 1,000 us while the current value of the sub-pixel SP is fixed to 30 mA and the data voltage value thereof is fixed to 1 V, thereby controlling the luminance. Therefore, the current value of the sub-pixel SP is fixed rather than variable, such that the color coordinate is not distorted. In FIG. 7, "w/PW" represents "with Pulse Width".

Figure 8A:
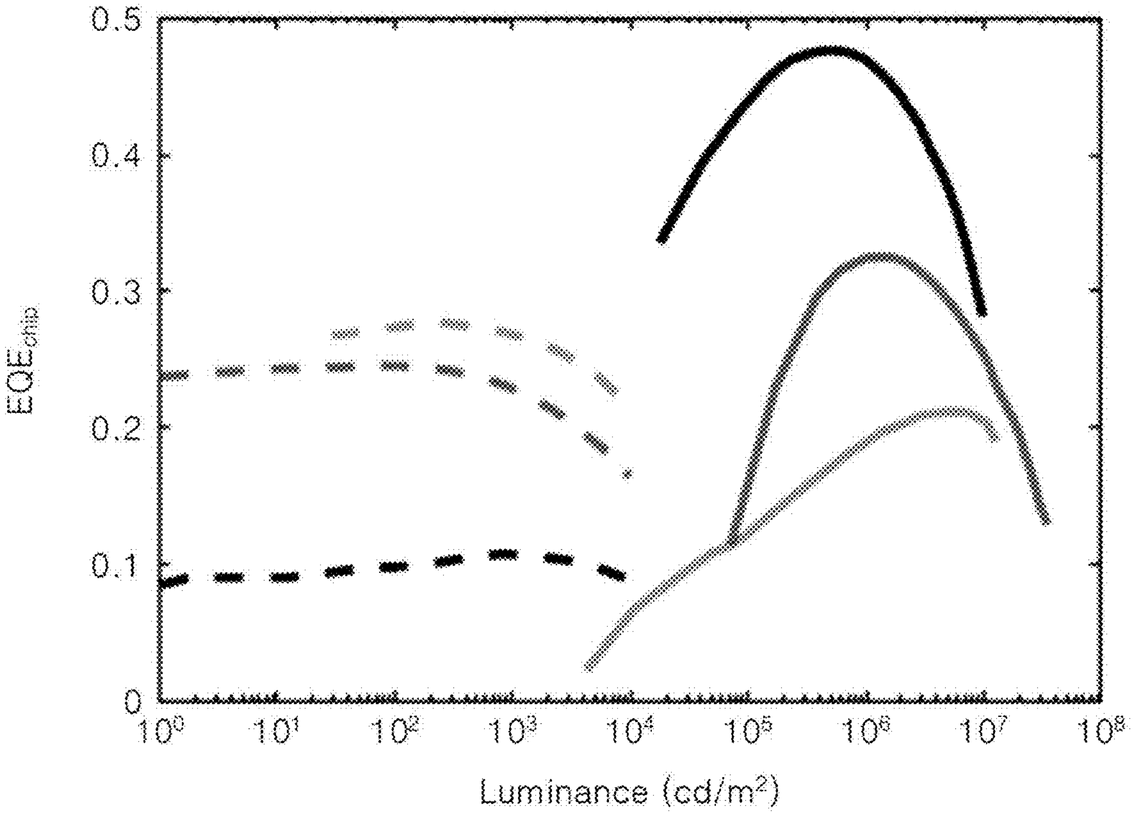
FIG. 8A is a diagram showing EQE based on the luminance of each of a light-emitting element according to an embodiment of the present disclosure and an organic light-emitting element.
Figure 8B:
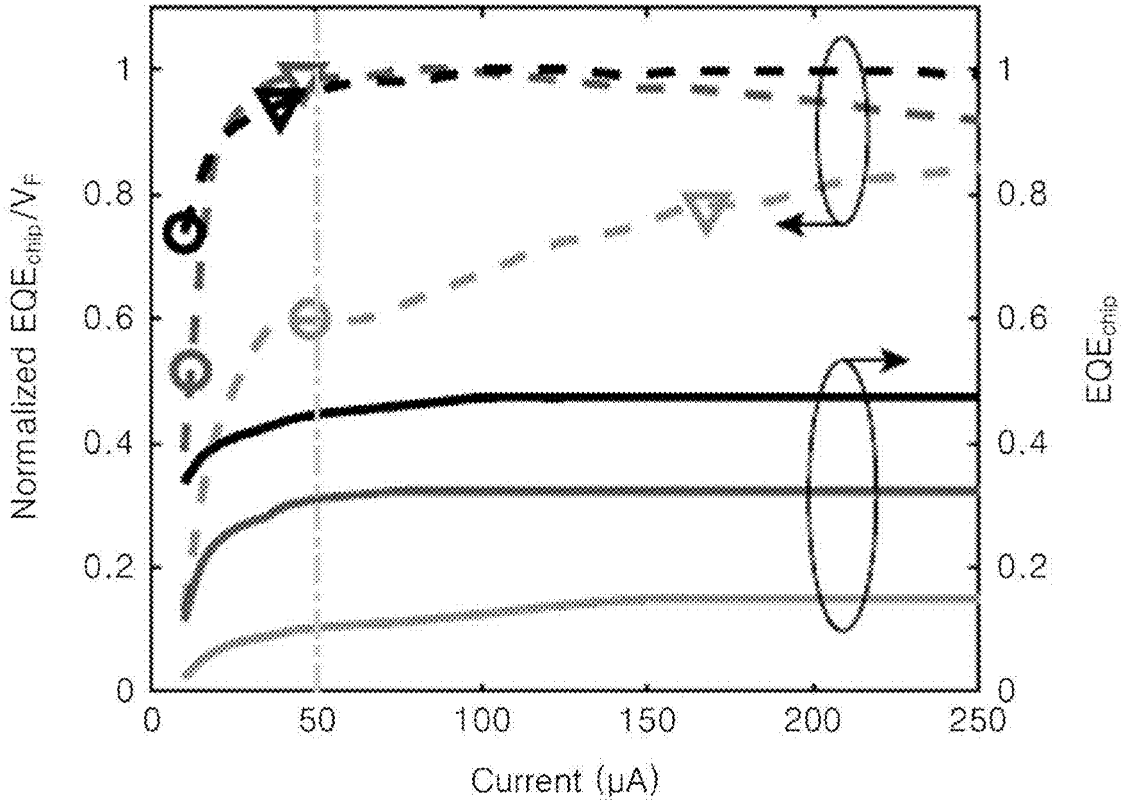
FIG. 8B is a diagram showing EQE characteristics based on the current of a light-emitting element according to an embodiment of the present disclosure.

FIG. 8A is a diagram showing EQE based on luminance of each of a light-emitting element according to an embodiment of the present disclosure and an organic light-emitting element OLED. FIG. 8B is a diagram showing EQE characteristics based on current of a light-emitting element according to an embodiment of the present disclosure.

Particularly, in FIG. 8A, a dotted line represents the EQE based on the luminance of the OLED element, and a solid line represents the EQE based on the luminance of the light-emitting element according to the present disclosure.

As shown in FIG. 8A, an X-axis indicates a color luminance. For example, 1000 cd/m$^2$ of white light is obtained by mixing color luminance of approximately [R: 300 cd/m$^2$, G: 600 cd/m$^2$, B: 100 cd/m$^2$] with each other. On the other hand, the EQEchip (the solid line in FIG. 8A) of a 90 μm×130 μm light-emitting element varies greatly depending on the luminance. A peak value of the EQEchip of the light-emitting element according to the present disclosure is higher than that of the OLED element, but is in the high luminance range.

In FIG. 8B, a dotted line represents a normalized EQEchip based on the current of the light-emitting element according to the present disclosure, and a solid line represents a dependent EQEchip based on the current thereof. In FIG. 8, "VF" represents the forward voltage applied to the light-emitting element.

As shown in FIG. 8B, it can be identified that as the current level of the light-emitting element increases, and thus the luminance thereof increases, the external quantum efficiency EQE thereof can be normal and the light-emitting efficiency can be improved. It can be identified that the light-emitting element has better EQE characteristics at high current.

Figure 9:
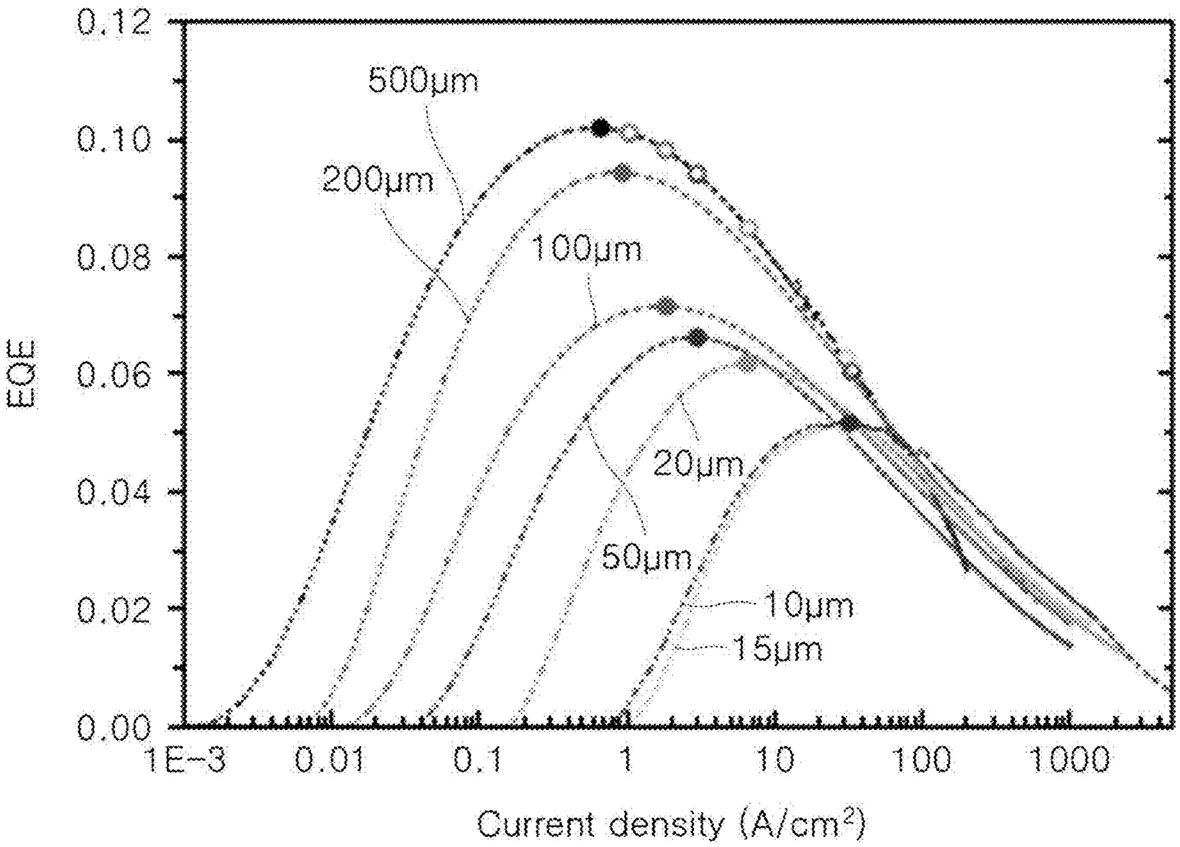
FIG. 9 is a diagram showing EQE and a current density based on the size of a light-emitting element according to an embodiment of the present disclosure.
Figure 10A:
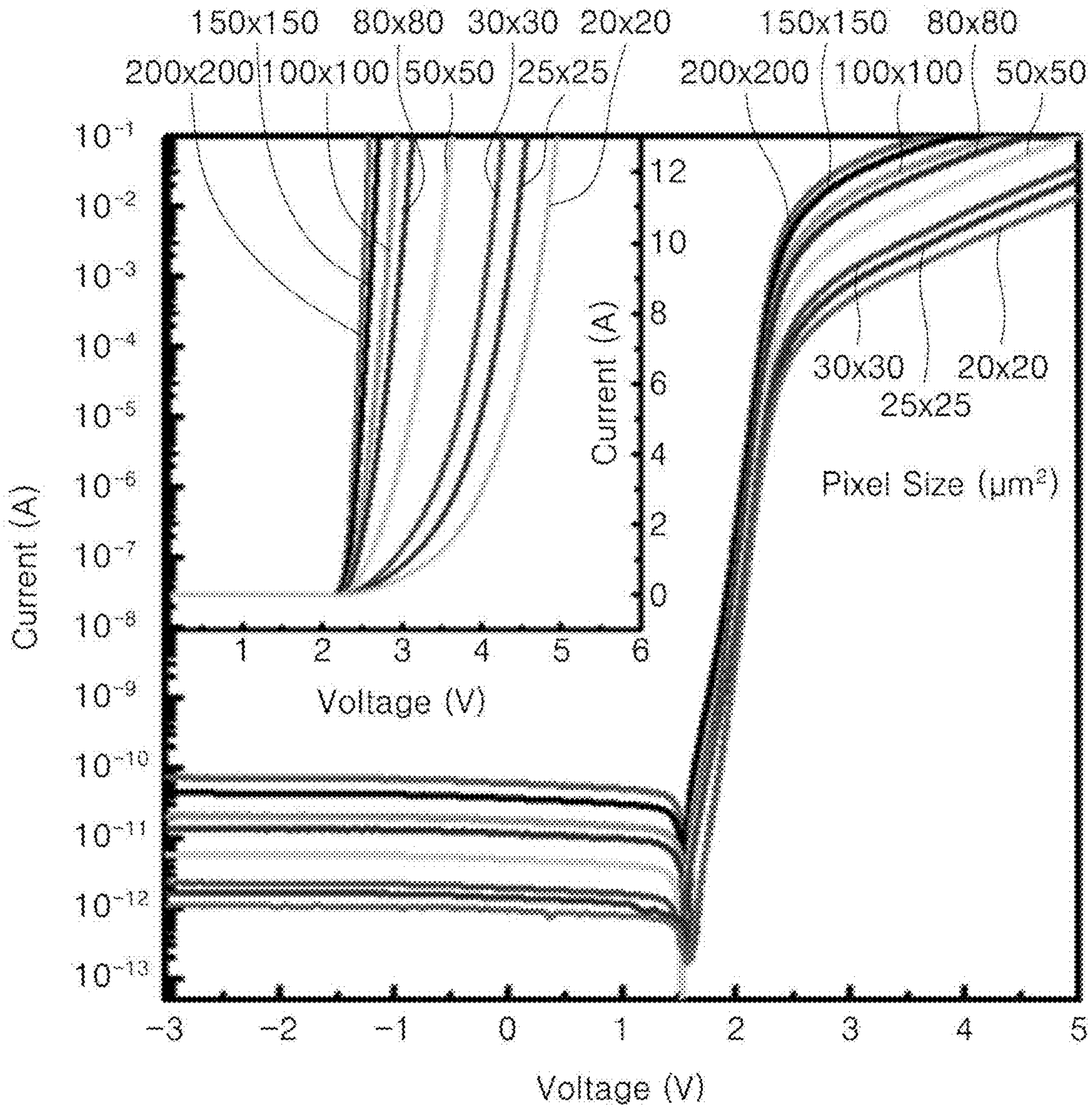
FIG. 10A is a diagram showing a current and voltage based on the size of a light-emitting element according to an embodiment of the present disclosure.
Figure 10B:
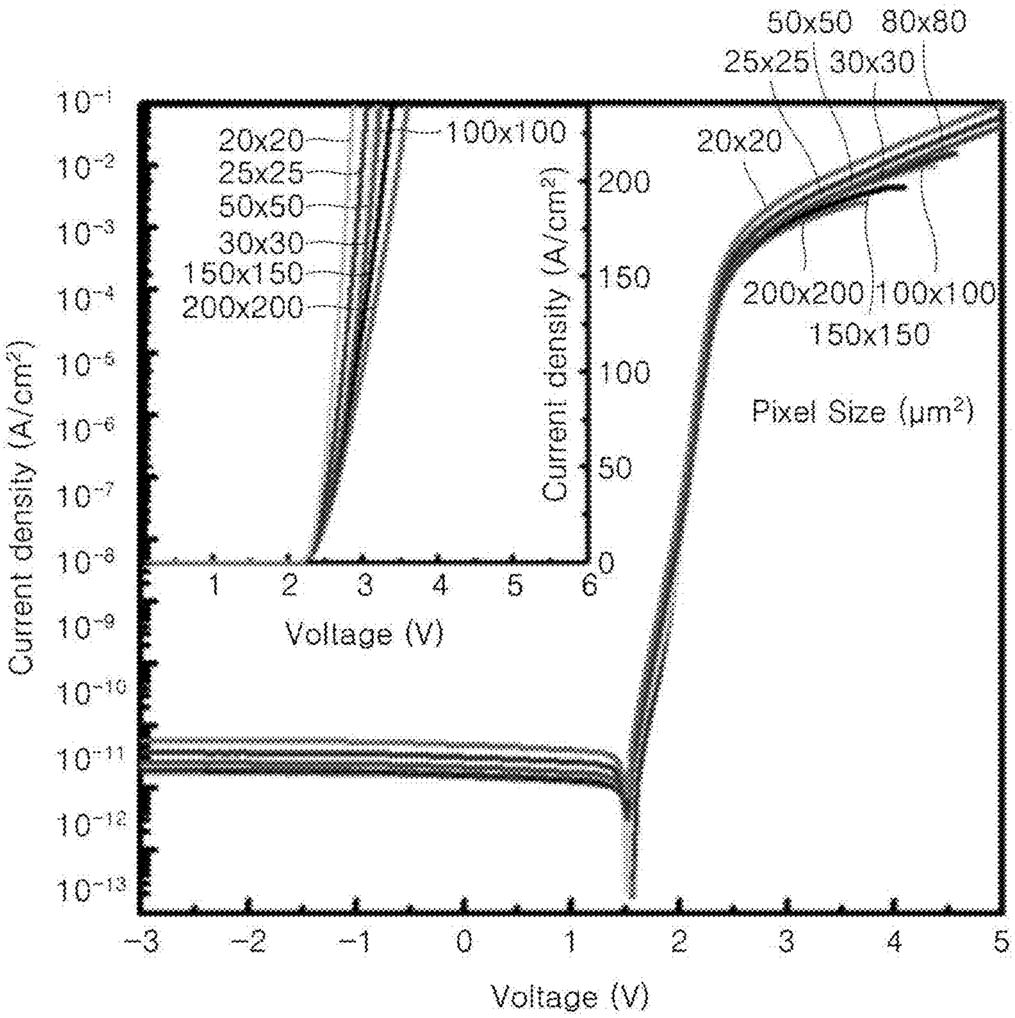
FIG. 10B is a diagram showing a current density and voltage based on the size of a light-emitting element according to an embodiment of the present disclosure.

FIG. 9 is a diagram showing EQE and a current density based on a size of a light-emitting element according to an embodiment of the present disclosure. FIG. 10A is a diagram showing current and voltage based on a size of a light-emitting element according to an embodiment of the present disclosure. FIG. 10B is a diagram showing a current density and voltage based on a size of a light-emitting element according to an embodiment of the present disclosure.

Referring to FIG. 9, it can be identified that as a chip size of the light-emitting element according to an embodiment of the present disclosure is smaller, the light-emitting element has a lower EQE value and a higher current density.

The current density (A/m$^2$) of the light-emitting element can be calculated as based on a following Equation 1:

$$\text{current density } (A/m^2) = \text{current } (A)/\text{light-emission area } (m^2) \qquad \text{[Equation 1]}$$

The current density (A/m$^2$) of the light-emitting element can be calculated by dividing the current value ampere (A) by the light-emission area (m$^2$).

Referring to FIG. 10A, it can be identified that as the pixel size of the light-emitting element increases, the current value increases as the voltage value increases. In FIG. 10A, it can be identified that the light-emitting element maintains a constant current value at a voltage range from −3V to 1.5V, and the current value thereof increases rapidly when the voltage value is in a range from 1.5V to 2V.

Referring to FIG. 10B, it can be identified that as the pixel size of the light-emitting element increases, the current density value increases as the voltage value increases. In FIG. 10B, it can be identified that the light-emitting element maintains a constant current value at a voltage range from −3V to 1.5V, and the current density value thereof increases rapidly when the voltage value is in a range from 1.5V to 2.5V.

As described above, the light-emitting element according to an embodiment of the present disclosure can avoid the low EQE efficiency period and can be applied to a small display device.

Figure 11:
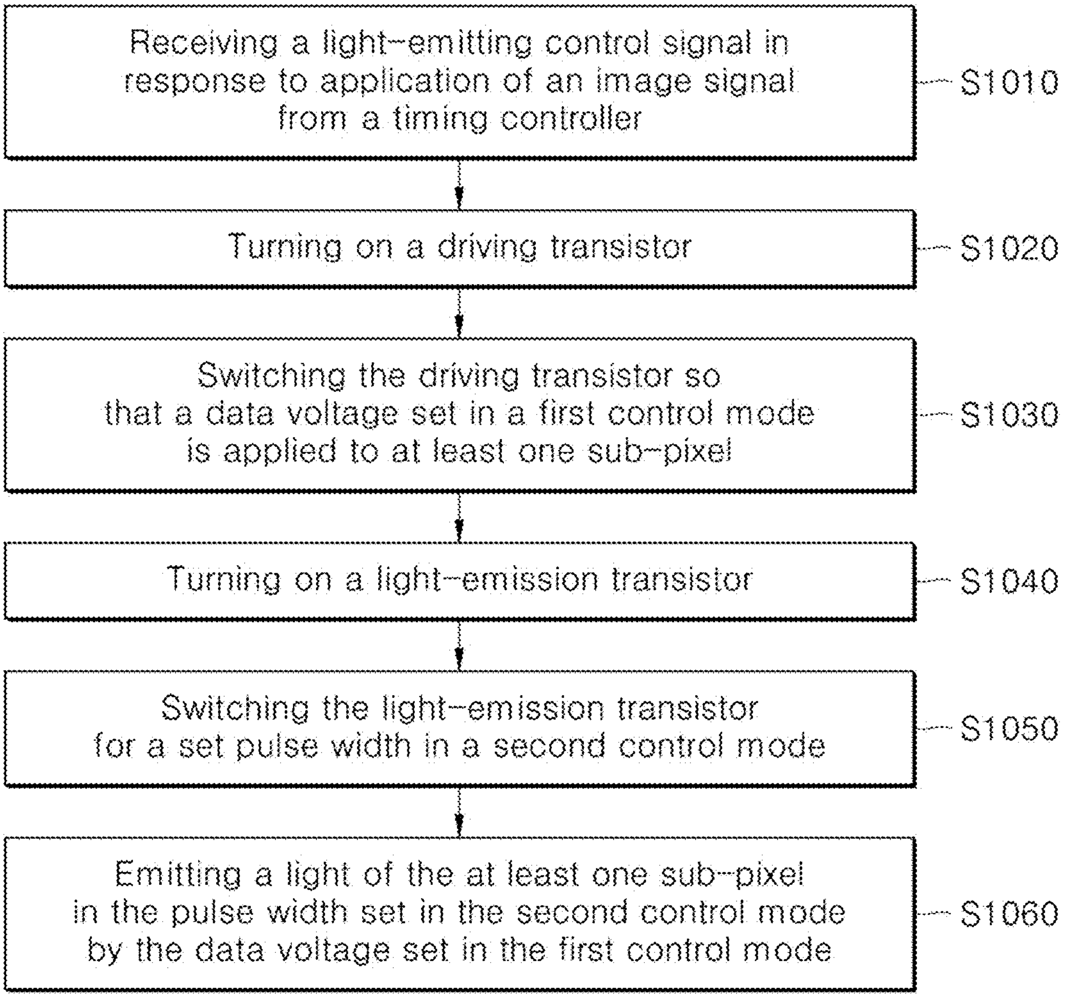
FIG. 11 is a flowchart illustrating a method for driving a display device according to an embodiment of the present disclosure.

FIG. 11 is a flowchart illustrating a method for driving a display device according to an embodiment of the present disclosure.

Referring to FIG. 11, in the display device operation method according to an embodiment of the present disclosure, first, the driver 150 can receive a light-emitting control signal (command) in response to application of the image signal from the timing controller TC in S1010.

Subsequently, the driver 150 can turn on the driving transistor T2 in S1020.

For example, the driver 150 can apply a high level signal to the gate electrode of the driving transistor T2 to turn on the driving transistor T2.

Subsequently, the driver 150 control a switching of the driving transistor T2 so that the data voltage set in the first control mode is applied to at least one sub-pixel in S1030.

In this regard, in the first control mode, the driver 150 fixes the pulse width to 1,000 μs, sets the current value of at least one sub-pixel to a specific value in a range of 30 to 60 mA, and sets the data voltage value thereof to a specific value in a range of 1 to 2V.

Subsequently, the driver 150 can turn on the light-emission transistor E-Tr in S1040.

For example, the driver 150 can apply a high level signal to the gate electrode of the light-emission transistor E-Tr to turn on the light-emission transistor E-Tr.

Then, the light-emission transistor E-Tr can be switched for the pulse width set in the second control mode in S1050.

In this regard, the driver 150 fixes the set data voltage of the sub-pixel to 1V, fixes the current value of the sub-pixel to 30 mA, and sets the pulse width to a specific value in a range of 10 to 1,000 μs in the second control mode.

Therefore, the at least one sub-pixel can emit light in the pulse width set in the second control mode by the data voltage set in the first control mode in S1060.

In this regard, the current value of the sub-pixel is fixed. Thus, the light-emitting element 140 of the sub-pixel can emit light while the color coordinate is not distorted.

As described above, according to an embodiment of the present disclosure, the display device including the driver can be realized in which in the first control mode (period), the driver fixes the pulse width of at least one light-emitting element and varies the data voltage thereof. In the second control mode (period), the driver fixes the data voltage and varies the pulse width.

Moreover, according to an embodiment of the present disclosure, the driving method of the display device can be realized in which the driver turns on the driving transistor such that the data voltage set in the first control mode is applied to at least one light-emitting element, and the drivers turns on the light-emission transistor such that the fixed data voltage is applied thereto for the pulse width set in the second control mode.

A first aspect of the present disclosure provides a display device comprising: a display panel including at least one of a first sub-pixel, a second sub-pixel and a third sub-pixel; and a driver configured to control light-emission operation of the at least one of the first to third sub-pixels, wherein the driver is configured to control the light-emission operation of the at least one of the first to third sub-pixels such that a data voltage value set in a first control mode is applied to the at least one sub-pixel for a pulse width set in a second control mode.

In one implementation of the display device, in the first control mode, the pulse width is fixed to a specific value, and each of a current value and a data voltage value of the at least one sub-pixel is variable, wherein in the second control mode, each of the current value and the data voltage value of the at least one sub-pixel is fixed to a specific value, and the pulse width is variable.

In one implementation of the display device, in the first control mode, the driver is configured to fix the pulse width to a specific value, and set the current value of the at least one sub-pixel to be a specific value in a range of 30 to 60 milliampere (mA) and set the data voltage value thereof to a specific value in a range of 1 to 2 volts (V).

In one implementation of the display device, in the second control mode, the driver is configured to fix each of the data voltage value and the current value of the at least one sub-pixel to a specific value, and set the pulse width to a specific value in a range of 10 to 1,000 microseconds (μs).

In one implementation of the display device, each of the first to third sub-pixels includes a micro-LED chip.

In one implementation of the display device, the driver is embodied as a micro driver configured to control light-emission operation of the micro-LED chip of the at least one of the first to third sub-pixels.

In one implementation of the display device, each of the first to third sub-pixels includes an organic light-emitting diode (OLED).

In one implementation of the display device, the first to third sub-pixels are configured to emit light of different colors, respectively.

In one implementation of the display device, a sub-pixel selected from among the first sub-pixel, the second sub-pixel, and the third sub-pixel is configured to emit light of one of red, blue, and green colors.

In one implementation of the display device, each of the first to third sub-pixels is electrically connected to a driver circuit for driving light-emission of each sub-pixel.

In one implementation of the display device, the driver circuit includes: a light-emission transistor connected to each sub-pixel and configured to be turned on for the pulse width set in the second control mode; and a driving transistor connected to and disposed between the light-emission transistor and a data voltage line, wherein the driving transistor is configured to switch application of the data voltage set in the first control mode to each sub-pixel.

In one implementation of the display device, the driver is configured: upon receiving a light-emitting control command from a timing controller, to turn on the driving transistor so that the data voltage set in the first control mode is applied to the each sub-pixel; and to turn on the light-emission transistor such that the light-emission transistor is turned on for the pulse width set in the second control mode.

In one implementation of the display device, a plurality of power lines, a plurality of scan lines, a reference voltage line, a data voltage line, and a light-emitting control line are disposed in the driver circuit.

In one implementation of the display device, the driver is configured: when an image signal is applied thereto, to generate a coordinate value of each sub-pixel to emit light among the first to third sub-pixels; and to apply the data voltage set in the first control mode to each sub-pixel corresponding to the generated coordinate value for the pulse width set in the second control mode.

A second aspect of the present disclosure provides a method for driving a display device, wherein the display device includes: a display panel including at least one of a first sub-pixel, a second sub-pixel, a third sub-pixel and a fourth sub-pixel; a light-emission transistor connected to each of the first to fourth sub-pixels; a driving transistor connected to the light-emission transistor; and a driver configured to control light-emission operation of the at least one sub-pixel, wherein the method comprises: (a) receiving, by the driver, a light-emitting control command upon application of an image signal from a timing controller thereto; (b) turning on, by the driver, the driving transistor; (c) turning on, by the driver, the driving transistor so that a data voltage set in a first control mode is applied to the at least one sub-pixel; (d) turning on, by the driver, the light-emission transistor; (e) turning on, by the driver, the light-emission transistor for a set pulse width in a second control mode; and (f) emitting, by the at least one sub-pixel, light based on the data voltage set in the first control mode and for the pulse width set in the second control mode.

In one implementation of the method, in the (c), in the first control mode, the driver is configured to fix the pulse width to a specific value, set a current value of the at least one sub-pixel to be a specific value in a range of 30 to 60 milliampere (mA) and set the data voltage value thereof to a specific value in a range of 1 to 2 volts (V).

In one implementation of the method, in the (e), in the second control mode, the driver is configured to fix the data voltage value to 1 volt (V), fix a current value of the at least one sub-pixel to 30 milliamperes (mA), and set the pulse width to a specific value in a range of 10 to 1,000 microseconds (μs).

Although the embodiments of the present disclosure have been described in more detail with reference to the accompanying drawings, the present disclosure is not necessarily limited to these embodiments, and can be modified in a various manner within the scope of the technical spirit of the present disclosure. Accordingly, the embodiments as disclosed in the present disclosure are intended to describe rather than limit the technical idea of the present disclosure, and the scope of the technical idea of the present disclosure is not limited by these embodiments. Therefore, it should be understood that the embodiments described above are not restrictive but illustrative in all respects. The scope of protection of the present disclosure should be interpreted according to the scope of claims, and all technical ideas within an equivalent scope thereto should be interpreted as being included in the scope of rights of the present disclosure.

What is claimed is:

1. A display device comprising:

a display panel including at least one of a first sub-pixel, a second sub-pixel and a third sub-pixel; and a driver configured to control a light-emission operation of the at least one of the first to third sub-pixels, wherein the driver is configured to control the light-emission operation of the at least one of the first to third sub-pixels so that:

in a first control mode, a pulse width is fixed and a data voltage value is varied such that the at least one of the first to third sub-pixels emits light at a first luminance; and in a second control mode, the data voltage value is fixed, and the pulse width is varied such that the at least one of the first to third sub-pixels emits light at a second luminance, wherein one of the first to third sub-pixels is electrically connected to a common power line, and includes a light-emissive layer, a first electrode, and a second electrode, wherein a gate insulating layer is disposed on the common power line, wherein a drain electrode of a driving transistor is disposed on the gate insulating layer, and wherein the first electrode of the one of the first to third sub-pixels is electrically connected to the drain electrode of the driving transistor via a pixel electrode, and the second electrode of the one of the first to third sub-pixels is electrically connected to the common power line via a common electrode.

2. The display device of claim 1, wherein in the first control mode, the driver is configured to fix the pulse width to a first specific value, set a current value of the at least one of the first to third sub-pixels to be in a range of about 30 to 60 milliampere (mA), and set the data voltage value of the at least one of the first to third sub-pixels to be in a range of about 1 to 2 volts (V).

3. The display device of claim 1, wherein in the second control mode, the driver is configured to fix the data voltage value and a current value of the at least one of the first to third sub-pixels respectively to second and third specific values, and set the pulse width to be in a range of about 10 to 1,000 microseconds (μs).

4. The display device of claim 1, wherein each of the first to third sub-pixels includes a micro-LED chip.

5. The display device of claim 4, wherein the driver is embodied as a micro driver configured to control light-emission operation of the micro-LED chip of the at least one of the first to third sub-pixels.

6. The display device of claim 1, wherein each of the first to third sub-pixels includes an organic light-emitting diode (OLED).

7. The display device of claim 1, wherein the first to third sub-pixels are configured to emit light of different colors, respectively.

8. The display device of claim 7, wherein a sub-pixel selected from among the first sub-pixel, the second sub-pixel, and the third sub-pixel is configured to emit light of one of red, blue, and green colors.

9. The display device of claim 1, wherein each of the first to third sub-pixels is electrically connected to a driving circuit for driving light-emission of each sub-pixel.

10. The display device of claim 9, wherein the driving circuit includes:

a light-emission transistor connected to each sub-pixel and configured to be turned on for the pulse width set in the second control mode; and a driving transistor connected to and disposed between the light-emission transistor and a data voltage line, wherein the driving transistor is configured to switch application of the data voltage value set in the first control mode to each sub-pixel.

11. The display device of claim 10, wherein the driver is configured to:

upon receiving a light-emitting control command from a timing controller, turn on the driving transistor so that the data voltage value set in the first control mode is applied to the each sub-pixel; and turn on the light-emission transistor so that the light-emission transistor is switched in the pulse width set in the second control mode.

12. The display device of claim 10, wherein a plurality of power lines, a plurality of scan lines, a reference voltage line, the data voltage line, and a light-emitting control line are disposed in the driving circuit.

13. The display device of claim 1, wherein the driver is configured to:

when an image signal is applied thereto, generate a coordinate value of each sub-pixel to emit light among the first to third sub-pixels; and apply the data voltage value set in the first control mode to each sub-pixel corresponding to the generated coordinate value for the pulse width set in the second control mode.

14. The display device of claim 1, wherein the first control mode is a high luminance operation of the at least one of the first to third sub-pixels.

15. The display device of claim 14, wherein the second control mode is a low luminance operation mode of the at least one of the first to third sub-pixels.

16. A display device comprising:

a display panel including at least one of a first sub-pixel, a second sub-pixel and a third sub-pixel; and a driver configured to control a light-emission operation of the at least one of the first to third sub-pixels, wherein the driver is configured to control the light-emission operation of the at least one of the first to third sub-pixels so that a data voltage value set in a first control mode is applied to the at least one of the first to third sub-pixels for a pulse width set in a second control mode, wherein a luminance of each of the first to third sub-pixels is set by varying the pulse width, wherein at least one sub-pixel among the first to third sub-pixels includes:

an active layer;

a first semiconductor layer provided on the active layer;

a second semiconductor layer;

a first electrode electrically connected to the first semiconductor layer; and a second electrode, wherein the active layer and the second electrode are provided on the second semiconductor layer, wherein one of the first to third sub-pixels is electrically connected to a common power line, wherein a gate insulating layer is disposed on the common power line, wherein a drain electrode of a driving transistor is disposed on the gate insulating layer, and wherein the first electrode of the one of the first to third sub-pixels is electrically connected to the drain electrode of the driving transistor via a pixel electrode, and the second electrode of the one of the first to third sub-pixels is electrically connected to the common power line via a common electrode.

* * * * *